(12) United States Patent
Belter et al.

(10) Patent No.: US 10,906,371 B2
(45) Date of Patent: Feb. 2, 2021

(54) INTEGRATED MULTIPLE ACTUATOR ELECTRO-HYDRAULIC UNITS

(71) Applicant: ClearMotion, Inc., Billerica, MA (US)

(72) Inventors: Joseph Thomas Belter, Somerville, MA (US); Clive Tucker, Charlestown, MA (US); Marco Giovanardi, Melrose, MA (US); Jack A. Ekchian, Belmont, MA (US); Zackary Martin Anderson, Cambridge, MA (US); John A. Laplante, Concord, NH (US)

(73) Assignee: ClearMotion, Inc., Billerica, MA (US)

( * ) Notice: Subject to any disclaimer, the term of this patent is extended or adjusted under 35 U.S.C. 154(b) by 89 days.

(21) Appl. No.: 16/065,338

(22) PCT Filed: Dec. 23, 2016

(86) PCT No.: PCT/US2016/068558
§ 371 (c)(1),
(2) Date: Jun. 22, 2018

(87) PCT Pub. No.: WO2017/112946
PCT Pub. Date: Jun. 29, 2017

(65) Prior Publication Data
US 2019/0308484 A1 Oct. 10, 2019

Related U.S. Application Data

(60) Provisional application No. 62/330,619, filed on May 2, 2016, provisional application No. 62/387,410, filed on Dec. 24, 2015.

(51) Int. Cl.
*B60G 17/016* (2006.01)
*B60G 17/033* (2006.01)
(Continued)

(52) U.S. Cl.
CPC ......... *B60G 17/0408* (2013.01); *B60G 7/006* (2013.01); *B60G 17/016* (2013.01);
(Continued)

(58) Field of Classification Search
CPC ............ B60G 17/0408; B60G 17/0272; B60G 17/016; B60G 17/033; B60G 17/0416;
(Continued)

(56) References Cited

U.S. PATENT DOCUMENTS 5,028,073 A 7/1991 Harms et al.
5,329,767 A 7/1994 Hewett
(Continued)

FOREIGN PATENT DOCUMENTS

DE 199 20 109 A1 11/2000
DE 19920109 A1 * 11/2000
(Continued)

OTHER PUBLICATIONS

PCT/US2016/068558, May 10, 2017, International Search Report and Written Opinion.

*Primary Examiner* — Keith J Frisby
(74) *Attorney, Agent, or Firm* — Wolf, Greenfield & Sacks, P.C.

(57) ABSTRACT

Integrated multiple actuator electro-hydraulic systems as well as their methods of use are described. Depending on the particular application, the integrated electro-hydraulic systems may exhibit different frequency responses and/or may be integrated into a single combined unit.

15 Claims, 28 Drawing Sheets

(51) Int. Cl.
*B60G 17/04* (2006.01)
*B60G 17/027* (2006.01)
*B60G 7/00* (2006.01)

(52) U.S. Cl.
CPC ....... *B60G 17/0272* (2013.01); *B60G 17/033* (2013.01); *B60G 17/0416* (2013.01); *B60G 2202/32* (2013.01); *B60G 2202/413* (2013.01); *B60G 2202/415* (2013.01); *B60G 2202/416* (2013.01); *B60G 2400/91* (2013.01); *B60G 2500/20* (2013.01); *B60G 2500/30* (2013.01); *B60G 2600/02* (2013.01); *B60G 2600/182* (2013.01); *B60G 2600/604* (2013.01); *B60G 2600/68* (2013.01); *B60G 2800/162* (2013.01); *B60G 2800/916* (2013.01); *B60G 2800/9123* (2013.01)

(58) Field of Classification Search
CPC .. B60G 17/04; B60G 17/027; B60G 17/0165; B60G 7/006; B60G 2600/68; B60G 2600/182; B60G 2600/604; B60G 2600/02; B60G 2800/9123; B60G 2800/916; B60G 2800/162; B60G 2202/415; B60G 2202/32; B60G 2202/416; B60G 2202/413; B60G 2500/20; B60G 2500/85; B60G 2500/30; B60G 2400/91; B60G 2400/252; B60G 2204/62
USPC ......... 280/5.514, 5.507, 5.515, 124.157, 5.5; 701/37

See application file for complete search history.

(56) References Cited

U.S. PATENT DOCUMENTS

| | | |
|---|---|---|
| 7,631,736 B2 | 12/2009 | Thies et al. |
| 9,068,616 B1 | 6/2015 | Serbu |
| 9,586,456 B2 | 3/2017 | Reybrouck |
| 2007/0089924 A1 | 4/2007 | de la Torre et al. |
| 2007/0170680 A1 | 7/2007 | Knaap |
| 2009/0121444 A1 | 5/2009 | Bushko et al. |
| 2009/0248246 A1 | 10/2009 | Parison, Jr. et al. |
| 2009/0260935 A1 | 10/2009 | Avadhany et al. |
| 2010/0072760 A1 | 3/2010 | Anderson et al. |
| 2010/0262308 A1 | 10/2010 | Anderson et al. |
| 2014/0265168 A1 | 9/2014 | Giovanardi et al. |
| 2014/0288776 A1 | 9/2014 | Anderson et al. |
| 2015/0360531 A1 | 12/2015 | Kim et al. |

FOREIGN PATENT DOCUMENTS

| | | |
|---|---|---|
| DE | 10 2004 056610 A1 | 6/2006 |
| WO | WO 2011/159874 A2 | 12/2011 |
| WO | WO 2014/145018 A2 | 9/2014 |
| WO | WO 2015/153811 A1 | 10/2015 |

\* cited by examiner

INTEGRATED MULTIPLE ACTUATOR ELECTRO-HYDRAULIC UNITS

RELATED APPLICATIONS

This application is a national stage filing under 35 U.S.C. 371 of International Patent Application Serial No. PCT/US2016/068558, filed Dec. 23, 2016, which claims the benefit of priority under 35 U.S.C. § 119(e) of U.S. provisional application Ser. No. 62/387,410, filed Dec. 24, 2015, and U.S. provisional application Ser. No. 62/330,619, filed May 2, 2016 the disclosures of each of which are incorporated herein by reference in their entirety.

FIELD

The methods and systems described herein relate to integrated multiple actuator electro-hydraulic units.

BACKGROUND

Suspension systems, including active suspension systems, are typically designed to, for example, properly support and orient a vehicle, provide safe handling in various operating environments, and ensure a comfortable ride for occupants. Active suspension systems and their control are described in U.S. Pat. No. 9,260,011 and U.S. patent application Ser. No. 14/602,463, filed Jan. 22, 2015 which are hereby incorporated herein by reference in their entirety. Hydraulic actuators are also used for adjusting vehicle ride height. For example, a hydraulically actuated spring seat adjustment system may be used for ride height adjustment in a vehicle.

SUMMARY

In some embodiments, an active suspension unit for a motor vehicle may include a first active suspension actuator with an internal volume and a first piston that operates in the internal volume and travels along a first axis, and applies a force on the body of the vehicle and a wheel assembly of the vehicle. Also included is a second actuator with an internal volume containing hydraulic fluid and a piston with a second axis of travel. The pressure of hydraulic fluid in the second actuator induces a force on the piston along the second axis of travel, where the second actuator also applies a force on the vehicle body and the same wheel assembly. The active suspension unit includes a first pressure source that has a port that is in fluid communication with the internal volume of the first actuator and a second pressure source that has a port that is in fluid communication with the internal volume of the second actuator. The two actuators are controlled to cooperatively apply a net force on the vehicle body and the wheel assembly. In some embodiments, the first and/or the second pressure sources are hydraulic pumps. In some cases, the first actuator has a faster response than the second actuator. A first actuator has a faster response than a second actuator if it produces a given output more quickly in response to the same command.

An embodiment of an active suspension unit supporting a corner of a vehicle includes a first actuator assembly operatively coupled to an electric motor. The rotation of the electric motor is at least partially converted to a first linear force that is applied between the vehicle body and one wheel assembly. The unit also includes a second actuator assembly that is operatively coupled to at least one electric motor, the rotation of which is also converted, at least partially, to a second linear force between the vehicle body and the same wheel assembly. A compliant element is operationally located between the actuator assembly and the vehicle body or the wheel assembly. The first assembly and the second assembly are controlled to cooperatively apply a net force on the vehicle body and wheel assembly. The first assembly has a bandwidth extending to an upper limit of at least 5 Hz, and the second assembly jointly with the compliant element has a bandwidth of up to, but no more than, 5 Hz. In some embodiments, the electric motor coupled to the first assembly and the electric motor coupled to the second assembly are the same electric motor. A frequency bandwidth of an actuator is the range of frequencies over which the output is within at least 3 dB of the commanded input.

In one embodiment, an integrated motion control unit includes a first actuator that has a housing with an internal volume separated into a compression volume and an extension volume by a double-acting piston which is attached to a piston rod. In hydraulic actuators with a piston and a piston rod, the extension volume contracts as the actuator extends and the piston rod at least partially leaves the actuator housing. The compression volume contracts when the actuator is compressed and the piston rod enters further into the actuator housing.

In this embodiment, the integrated control unit also includes a hydraulic motor-pump that has a first port that is in fluid communication with the extension volume and a second port that is in fluid communication with the compression volume. Further, the integrated motion control unit includes a second actuator that has a first volume, a second volume, and a double-acting piston that extends radially around the housing of the first actuator and along at least a portion of the axial length of the housing of the first actuator. In the second actuator, the first volume is in fluid communication with the first port of the hydraulic motor-pump and the second volume is in fluid communication with the second port of the hydraulic motor-pump. The first actuator and the second actuator of the integrated motion control unit are positioned operatively parallel to each other, and are interposed between a first structure and a second structure.

External piston actuators may extend radially and encircle the cylindrical housing of an associated actuator which has a piston and a piston rod. Such external piston actuators may also have an extension volume and a compression volume. In external piston actuators, the extension volume also contracts as the annular piston moves in the extension direction of the associated actuator and a compression volume that contracts as the external piston moves in the compression direction of the associated actuator.

In still another embodiment, an integrated motion control unit includes a first actuator that has a housing with an internal volume separated into a compression volume and an extension volume by a double-acting piston with a piston rod attached to it. Additionally, the integrated motion control unit includes a hydraulic pump (which may be a motor-pump) that has a first port that is in fluid communication with the extension volume and a second port that is in fluid communication with the compression volume, and a pressurized accumulator. Further, the integrated motion control unit includes a second actuator with a single-acting piston that extends radially around the housing of the first actuator and along at least a portion of the axial length of the housing of the first actuator. The volume of hydraulic fluid within the second actuator separate from the internal volume of the first actuator is in selective fluid communication with the pressurized accumulator. A motor-pump, pump-motor, or motor/pump is a hydraulic device that can operate as a hydraulic pump or as a hydraulic motor.

In yet another embodiment, an integrated motion control unit includes a first actuator that has a housing with an internal volume separated into a compression volume and an extension volume by a double-acting piston, and a piston rod attached to the piston. Further, the integrated motion control unit includes a hydraulic pump that has a first port that is in fluid-communication with the extension volume, and a second port that is in fluid communication with the compression volume. Additionally, the integrated motion control unit includes a second actuator that includes a first volume, a second volume, and a double-acting piston. The double-acting piston has a first surface that is acted on by the fluid in the first volume, and a second surface that is acted on by the fluid in the second volume. In the second actuator, the first volume is in fluid communication with the first port of the hydraulic pump, and the second volume is in fluid communication with the second port of the hydraulic pump. In the integrated motion control unit, the first actuator and the second actuator are positioned operatively parallel to each other, and are interposed between a first and a second structure, where the first actuator has a faster response than the second actuator. Two actuators may be operatively parallel to each other when they exert forces that are effectively in the same or opposed directions.

In another embodiment, a method of controlling relative motion between a first structure and a second structure by applying a net force on the two structure includes: driving a hydraulic pump with an electric motor operatively coupled to the hydraulic pump; supplying pressurized hydraulic fluid to a volume in a first actuator, where the first actuator is interposed between the first and the second structure; supplying pressurized hydraulic fluid to a volume in a second actuator, where the second actuator is interposed between the first and the second structures and arranged in an operatively parallel arrangement with the first actuator; where a Total Effective Force Area (TEFA) of the first actuator and the second actuator in at least one of the compression direction and the extension direction is a function of the frequency of pressure variation applied to the first actuator and the second actuator by the hydraulic pump.

In yet another embodiment, a method of controlling relative motion between a first structure and a second structure by applying a net force on the two structures includes: driving a hydraulic pump with an electric motor operatively coupled to the hydraulic pump; supplying pressurized fluid to a hydraulic actuation apparatus that is interposed between the first and the second structures; where the pressure of the hydraulic fluid acts on the TEFA of the actuation device to produce a force; and where the TEFA is a function of the frequency of the pressure variation applied to the hydraulic actuation apparatus by the pump; and applying the force to the first structure and the second structure.

In another embodiment, an integrated suspension unit includes a first actuator that includes a housing with an internal cylindrical volume separated into a compression volume and an extension volume by a double-acting piston, and a piston rod attached to the piston. The integrated suspension unit also includes a hydraulic motor-pump that has a first port that is in fluid communication with the extension volume, and a second port that is in fluid communication with the compression volume. Additionally, the integrated suspension unit includes a tandem annular double-acting piston that surrounds at least a portion of the axial length of the housing of the first actuator. The first volume and second volume are in fluid communication with the first port of the hydraulic motor-pump, and a third and fourth volume are in fluid communication with the second port of the hydraulic motor-pump. Further, the pressure in the first volume acts on the EFA of the first volume and the pressure in the third volume acts on the EFA of the third volume to produce a force in the compression direction of the first actuator, the pressure in the second volume acts on the EFA of the second volume, and the pressure in the fourth volume acts on the EFA of the fourth volume to produce a force in the compression direction of the first actuator.

In yet another embodiment, an active motion control unit includes a first actuator with an internal volume and a first piston that is slidably received in the internal volume and travels along a first axis, where the first actuator is interposed between a first structure and a second structure. Further, the active motion control unit includes a second actuator with an internal volume containing a hydraulic fluid and a piston with a second axis of travel, where a pressure of the hydraulic fluid induces a force on the piston along the second axis of travel, and where the second actuator is interposed between the first structure and the second structure. The active motion control unit also includes a hydraulic pump with at least a first port that is in fluid communication with the internal volume of the first actuator and the internal volume of the second actuator. Additionally, the active motion control unit includes a low pass hydraulic filer that regulates fluid flow between the first port and the internal volume in the second actuator, where a response frequency of the second actuator is determined, at least in part, by the low pass filter.

In another embodiment, an active suspension unit of a motor vehicle includes a first active suspension actuator with an internal volume and a first piston that is slidably received in the internal volume and travels along a first axis, where the first actuator is interposed between a vehicle body and a wheel assembly. Further, the active suspension unit of a motor vehicle includes a second actuator with an internal volume containing hydraulic fluid and a piston with a second axis of travel, where a pressure of the hydraulic fluid induces a force on the piston along the second axis of travel. The second actuator is also interposed between the vehicle body and the wheel assembly. The active suspension unit of a motor vehicle further includes a first hydraulic pump with at least a first port that is in fluid communication with the internal volume of the first actuator, and a second hydraulic with at least a first port that is in fluid communication with the internal volume of the second actuator. In the active suspension unit of a motor vehicle, both the first and second actuators are controlled to cooperatively apply a net force on the vehicle body and the wheel assembly.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. It two or more documents incorporated by reference include conflicting and/or inconsistent disclosure respect to each other, then the document having the later effective date shall control.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

Figure 1:
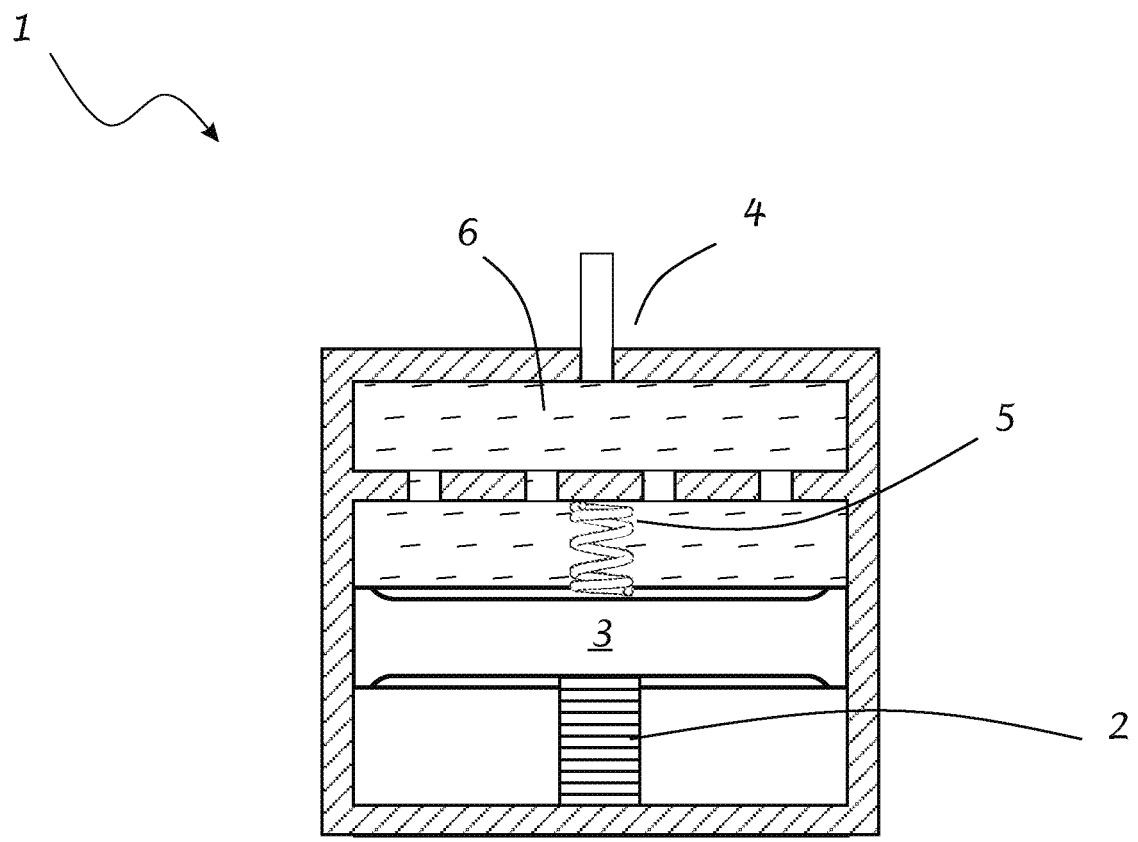
FIG. 1 illustrates a device for characterizing hydraulic low pass filters.

Certain exemplary embodiments will now be described to provide an overall understanding of the principles of the structure, function, manufacture, and use of the system and methods disclosed herein for an active suspension system. One or more examples of these embodiments are illustrated in the accompanying drawings and described herein. Those of ordinary skill in the art will understand that the systems, methods and examples described herein and illustrated in the accompanying drawings are non-limiting exemplary embodiments and that the scope of the present invention will be defined solely by the claims.

The features illustrated or described in connection with one exemplary embodiment may be combined with features of other embodiments and the features may be used individually, singularly and/or in various combinations. Such modifications are intended to be included within the scope of the present disclosure.

DETAILED DESCRIPTION OF EMBODIMENTS

Vehicular suspension systems may use a passive or semi-active damper or active actuator located in an operatively parallel orientation or in an operatively series orientation with a primary suspension spring to support a vehicle body relative to one of multiple associated wheel assemblies. In some instances, a supplemental single acting actuator, i.e. pressurized fluid is only applied to one side of the associated piston, may be used to permit adjustment of a vehicle's ride height. Two actuators and/or a compliant element and/or a damping element are operatively in series to each other if the forces that they apply on a structure are effectively in series.

The Inventors have recognized several limitations associated with the above noted systems. Specifically, many of the systems used for ride height adjustment use pumps that are sized to support the entire applied weight of the vehicle. Depending on the particular application, this may lead to the use of large pumps that are expensive and energy inefficient. Accordingly, in some embodiments, the Inventors have recognized that it may be desirable to provide an overall smaller system, with reduced energy consumption, active control of ride height, and/or any to address any other applicable desired benefit.

In view of the above, the Inventors have recognized the benefits associated with integrated actuator systems, and/or other hydraulic devices, used to apply forces to two or more associated structures with two or more actuators powered with a hydraulic pressure or force source. Additionally or alternatively, multiple pumps and/or pressure sources may be used cooperatively in a manner that reduces the needed total pump capacity. Thus, in some embodiments, for example, a combination of multiple actuators may be interposed between a wheel assembly and a vehicle body, or other structures in operatively parallel and/or series arrangements with the one or more suspension springs, to control the motion and/or position of the vehicle body and/or wheels with respect to the road and/or the relative movement between the structures. Additionally, these hydraulic actuators, dampers, or other hydraulic devices may be located in operatively parallel and/or series arrangements with one or more suspension springs or other devices located within a vehicle or structure in some applications. Further, these systems may be used to control ride height, vehicle roll and/or vehicle motion in the vertical direction by using multiple actuators powered by a single hydraulic pump or motor-pump. These systems may also be used in applications such as earthquake mitigation systems for buildings, movement mitigation systems for skyscrapers, and/or any other appropriate application where actuators may be used for either generating and/or mitigating motion in various frequency ranges and/or applications as the disclosure is not so limited.

In one embodiment, two or more actuators may be used to control the relative movement of two structures, such as a wheel assembly of a vehicle and a vehicle body, at different frequencies. Each of the two or more actuators may be appropriately sized to work with a pump and/or other pressure source to handle the forces and fluid flows expected within these frequency ranges. Therefore, a first actuator may be sized to work with a pump and/or other pressure source to efficiently control the relative motion between the structures over a broad range of frequencies, while a second actuator may be sized to work with a pump and/or other pressure source to efficiently control the lower frequency relative motion between the structures that is below the frequency threshold. Without wishing to be bound by theory, higher frequency relative motions of structures typically correspond to higher fluid flow velocities than lower frequency relative motions between the structures. Accordingly, by splitting the frequency response of the suspension system between these two actuators, the overall system may use less energy because less fluid needs to be pumped into and out of the lower frequency response actuator for handling the movements above the frequency threshold than would need to be used if a single actuator were used to mitigate movements of the structures over the entire frequency range.

In instances where two or more actuators are used for controlling the relative movement of two associated structures, it may also be beneficial to control the actuation of these actuators by using a single pump. In addition, as further described below, in some embodiments, one or more properly sized hydraulic filters may be used to automatically control the response of the actuators relative to changes in operation of an associated pressure source such as a pump, hydraulic motor, hydraulic motor/pump and/or a pressurized accumulator. In such an embodiment, a properly sized hydraulic low pass frequency filter may be located between a pressure source and one or more pressurized fluid chambers in an actuator, such as an extension or compression volume. A low pass frequency filter may also be referred to as a low pass filter, a hydraulic filter, a frequency filter, a filter, or other similar term in the current disclosure. The frequency filter may exclude components of the pressure variations applied by the pressure source from being applied to an associated actuator if those components are either above a desired threshold frequency. For example, in one embodiment, one or more properly sized hydraulic filters may be located in line between the pressure source and one or more pressurized fluid chambers of an actuator to exclude pressure variations with frequencies above a threshold frequency. Separately, the fluid pressure source may also be in fluid communication with a separate actuator which may allow for the control of the actuator associated with the frequency filter at frequencies below the threshold frequency and the other actuator at frequencies above and below the threshold frequency. Of course, as elaborated below, other configurations are also possible as this disclosure is not so limited.

In the various embodiments described herein, it should be understood that a frequency filter for a hydraulic system may correspond to any appropriate structure, and/or combination of structures and/or system attributes, capable of appropriately mitigating pressure variations above a desired pressure threshold. This includes structures and system attributes such as, for example, system compliance, hydraulic mass, fluid mass, fluid path length, valves, restrictions, and/or any other appropriate structure capable of tuning the frequency response of a particular flow path between a pressure source and a pressurized volume. One of ordinary skill in the art would be able to determine the frequency response of a particular flow path using basic hydraulic design principles and equations in addition to the use of modeling techniques such as finite element modeling of the desired hydraulic system. Additionally or alternatively, the frequency response characteristics of a hydraulic circuit may be determined experimentally by, for example, using a high impedance high bandwidth pressure source. Such a source that may be used is a piston pump driven by a piezoelectric stack.

The schematic in FIG. 1 shows an embodiment of high impedance pressure source 1. The piezo stack actuator 2 moves the piston 3 to produce pressure fluctuations at outlet 4. The piezoelectric stack 3 may be biased in compression by spring 5 and thus allow the piston to be moved with a bidirectional stroke. Pressure fluctuations in the fluid in volume 6, induced by the motion of the piston 3, may be conveyed to the system being tested through port 4. The bias spring in FIG. 1 is shown as a coil spring but any convenient spring, such as a stiff Belleville Washer CDM-602130, may be used. By operating the pressure source over a range of frequencies it is possible to characterize a hydraulic filter in a particular flow channel in order determine the range of frequencies over which attenuation occurs when using a given hydraulic filter in a given apparatus.

In addition to the above, the Inventors have recognized the benefits associated with the use of an annular double acting piston that surrounds at least a portion of the housing of an associated first actuator. For example, the double acting piston may extend radially around, and along at least a portion of the length, of the first actuator. The double acting piston may also include a first volume that is in fluid communication with a first port of an associated pressure source, such as a hydraulic motor-pump, and a second volume that is in fluid communication with a second port of the pressure source. Accordingly, the pressure source may apply a differential pressure between the two volumes to apply a corresponding force to the annular double acting piston in a desired corresponding direction. Depending on the particular application, the pressure source may also be in fluid communication with the first actuator as well. Additionally, the first actuator and the second actuator may be arranged such that they apply forces operatively parallel to a first structure and a second structure that they are disposed between. Examples of specific structures related to such an embodiment elaborated on further below.

In yet another embodiment, the Inventors have recognized the benefits associated with using an accumulator that is in fluid communication with one or more actuators to maintain a desired minimum or nominal pressure threshold within an extension or compression volume or other pressurized volume of one or more actuators within a suspension system. For example, in one embodiment, an accumulator may be in fluid communication with a ride height adjustment actuator such that it maintains a pressure in the compression volume sufficient to support at least a portion of a structure's weight, such as a vehicle's weight. Without wishing to be bound by theory, this may improve the energy efficiency of an actuator due to an associated pressure source only needing to apply energy sufficient to generate a portion of the force, instead of the entire force, needed to displace the associated structure.

Typically, as a vehicle travels over a road, both the vehicle body and the wheels may undergo road-induced motion over a wide range of frequencies. For example, the vehicle body may move at frequencies ranging from 0 Hz to 5 Hz, 0 Hz to 4 Hz, 0 Hz to 3 Hz or in any other appropriate frequency range, including frequencies greater than those noted above. Additionally, in some embodiments, the majority of movements of a typical vehicle body may occur in a frequency range between about 1 Hz to 3 Hz. In some embodiments, the vehicle body frequencies may be primarily dominated by the resonant frequency of the vehicle body mass supported on the main suspension springs. In addition to the above, in some embodiments, the wheels may move at frequencies between 8 Hz and 20 Hz, 8 Hz and 15 Hz, or in some embodiments at frequencies of 20 Hz or higher. Wheel movement frequency is oftentimes dominated by the resonant frequency of the unsprung mass supported on the stiffness of the tire. Of course, one of ordinary skill in the art would understand that the particular frequencies associated with vehicle body and wheel movements will vary based on the particular type of vehicle being used. For example, the suspension responses of a typical passenger vehicle are expected be different from those for a large piece of mining equipment such as dump truck. Therefore, wheel and body frequencies, as well as response frequencies for other structures, both greater and less than those noted above may be used with the various embodiments disclosed herein as the disclosure is not so limited.

In addition to mitigating vehicle body and/or wheel motion as noted above, in some embodiments, it may be desirable to mitigate other various types of vehicle events such as roll or pitch motion caused by navigating a turn, accelerating, and/or decelerating. For example, when a vehicle travels along a curved road, the vehicle rolls so that the side of the vehicle closer to the center of rotation is raised while the opposite side of the vehicle moves closer to the road. Similarly, the vehicle may pitch when brakes are applied and the vehicle undergoes vertical movement such that the front of the vehicle typically dips down relative to the rear of the vehicle, respectively. A corresponding vehicle movement may occur to pitch the front of the vehicle up relative to the rear of the vehicle during acceleration. These motions may be mitigated in frequency ranges either within the same, or different, frequency ranges than those noted above for body motion frequencies. In some embodiments, other events such as raising or lowering the vehicle may be controlled at still another or lower frequency. Accordingly, in some embodiments, the above noted motions may be mitigated at frequencies between or equal to 0 Hz and 10 Hz, 0 Hz and 5 Hz, 0 Hz and 4 Hz, 0 Hz and 2 Hz, 1 Hz and 3 Hz, or any other appropriate frequency range including frequencies both greater than and less than those ranges noted above, as the disclosure is not so limited.

As noted previously, in some embodiments, it may be desirable to alter the ride height of a vehicle to improve vehicle performance when encountering different driving conditions and scenarios. For example, it may be desirable to raise the vehicle body so the vehicle may traverse the transition between a street and an adjoining steep driveway. At other times, it may be desirable to lower the vehicle when traveling at high speeds in order to reduce aerodynamic drag forces. Vehicle ride height may also be altered to compensate for variation in gross vehicle weight. Controlling vehicle ride height may occur at frequencies that are significantly lower than that of vehicle body frequencies. For example in some embodiments, ride height may be controlled at frequencies between or equal to 0 Hz and 1 Hz, 0 Hz and 0.1 Hz, 0 Hz and 0.01 Hz, or any other appropriate frequency including frequencies both greater and less than those in the ranges noted above.

In some embodiments, a fast response active suspension actuator may be located at each corner of a vehicle, and may be used to mitigate motion of the vehicle body and the wheels over a broad spectrum of frequencies. Depending on the particular application, in one embodiment, a fast response active suspension actuator may be defined as an actuator that has a force control frequency bandwidth (i.e. the actuator is capable of generating or resisting forces at frequencies at or below the noted frequency), extending to at least 30 Hz, 20 Hz, 10 Hz, 5 Hz or any other appropriate frequency range based on the intended application.

Therefore, it should be understood that in other embodiments, a fast response actuator may operate within different operational frequency bandwidths. In some embodiments, a fast response actuator may simply refer to an actuator with a frequency response capability that is faster than the frequency response capability of an associated second actuator.

In view of the above, in one exemplary embodiment, a fast response actuator may be interposed between a first structure and a second structure such as a top mount and a wheel assembly of a vehicle. This fast response actuator may be located operatively in parallel with an auxiliary slower response actuator and/or a suspension spring perch adjustment actuator which may be installed operatively in series with, for example, a coil spring, an air spring, or other convenient suspension spring device. The spring device may be installed above or below the associated actuator as the disclosure is not so limited.

In some vehicular embodiments, the above noted embodiments using multiple actuators may be employed at each corner of a vehicle or at other points of other appropriate structures. Regardless, in some instances, the disclosed combination of multiple actuators and methods of use described herein may provide a desirable balance of fast response, greater force, and/or reduced power consumption than is possible with a single actuator sized to provide certain combined performance of the multiple actuators. In some embodiments, two or more of these actuators may be combined in a single unit and/or be powered by a single electric motor-generator/hydraulic motor-pump unit.

For the sake of clarity, the embodiments described below in regards to the figures are described relative to an electric motor. However, it should be understood that the embodiments described herein may also be operated using an electric generator and/or an electric motor-generator, where an electric motor-generator is an electrical device that may be operated as an electric motor and/or an electric generator. Therefore, the embodiments described her may be used with any of the above noted electrical devices as the disclosure is not so limited.

For the sake of clarity, the embodiments described below in regards to the figures are also primarily directed to the use of hydraulic motor-pumps. However, the embodiments described herein are also usable where appropriate with hydraulic motors and/or hydraulic pumps. A hydraulic motor-pump is a hydraulic device that may be operated as a hydraulic motor and/or a hydraulic pump. Accordingly, the embodiments described herein may be used with any of the above-noted hydraulic devices as the disclosure is not so limited.

In the embodiments described herein, a spring, such as a main suspension spring, may be, for example, a coil spring, an air spring or any other appropriate compliant spring like component or device that may support the weight of a vehicle body, or other structure, under static conditions.

In some embodiments, a higher force but slower response, auxiliary active suspension actuator may be used to introduce, mitigate, and/or eliminate certain motions between two associated structures such as roll and/or pitch or assist the faster response actuator in responding to slowly changing forces. When implemented in a vehicle, such an embodiment may include an actuator placed operatively in a series arrangement with the main suspension spring which is operatively in parallel with the faster response actuator. By using such an arrangement, the force capacity of the overall system may be increased without significantly increasing the inertance of the system (at higher frequencies. Again, this combination of actuators may be used to achieve a desired level of force without adversely affecting the response of the system. For example, in an active suspension system, the pump and faster response actuator are capable of responding quickly to road inputs to generate corresponding active and/or passive forces so that, for example, the suspension still appears soft when a high frequency impact is experienced from the road.

In some embodiments of actuation systems, the moment of inertia of the rotating elements of the actuator, when the actuator is back-driven by external input, is an important parameter. The lower the inertia, the more easily (without producing excessive reaction force) the actuator may be driven backwards by an external stimulus.

In an actuator with a linear output driven by a rotating device, such as an electric motor, the moment of inertia of all rotating components that play a part in converting the output of the motor to the linear output of the actuator affect the back driveability of the actuator. The inertia of these components affects the reaction force of the actuator to an external stimulus. This force is proportional to the sum of the moment of inertia of each rotating part multiplied by its angular acceleration scaled by the square of the motion ratio of angular motion of each component to the linear motion of the actuator output. The magnitude of this effect is inertance and has the units of kilograms.

In an embodiment of a linear actuator, an electric motor may be coupled, for example, to a pump or a screw mechanism, and/or to a linear lever, through a shaft, which may be held in place, for example, by one or more bearing elements. The rotating parts of each of these elements may contribute to the system inertance as scaled by their respective motion ratios.

For example, bearing elements typically circulate at a fraction of the rotational speed of the inner or outer race moving with the element constrained by the bearing.

In other embodiments, the inertance may be due, for example, to the rotational inertia of a pinion element rotating on a geared rack, or of a rotating hydraulic pump element and motor in an electro-hydraulic active suspension actuator.

In some applications, a typical active actuator located operatively in parallel with a suspension spring may be able to achieve a maximum force exertion of 500 N with an associated pump element contributing 5 kg of reflected pump inertia to the movement of the vehicle wheel. To generate a maximum force exertion of 1000 N (double the previous), the same system may contribute 25 kg of reflected pump inertia to the movement of the vehicle wheel assembly. Without active control systems or other mitigating methods, the increased reflected pump inertia would allow high frequency road inputs (i.e. those inputs with frequencies above the control bandwidth of the active suspension) to be transmitted to the body of the car. Accordingly, these systems may not be able to achieve a desired level of road isolation.

In contrast to the above noted higher inertia system, if a slower response actuator operatively in series with a spring element was placed operatively in parallel with the active suspension system, it could provide the additional 500 N of force needed at lower frequencies (for example between 1 to 3 Hz, or other appropriate frequencies) without adding to the reflected pump inertia for high frequency road inputs. The result is a system that is able to achieve both high force output and better road isolation. While specific forces and system inertias have been noted above, it should be understood that the values above have been provided for exemplary purposes, and the actuators and other hydraulic devices described herein may have any appropriate force capacity, inertia, and/or frequency response as the disclosure is not so limited.

In some embodiments, an additional actuator may be used to, for example, move a spring perch of a vehicle's main suspension spring in order to adjust a vehicle's ride height and/or to alter the load transmitted through the main suspension spring (compressing to increase force on the body, and extension to reduce the load on the vehicle body). This actuator may also be arranged in a series arrangement with the main suspension spring. In some embodiments, this actuator, or other appropriate actuators, may be biased using a pressurized accumulator, such that the actuator is able to support the static weight of a vehicle body at one corner of the vehicle or other appropriate structure.

In some embodiments, each corner of a vehicle may have, for example, a fast response active suspension actuator, an auxiliary high force actuator, and/or a high force perch adjustment actuator. Alternatively, each corner may have any two of these actuators or only one active actuator. The actuators in each corner may also work cooperatively with each other in some embodiments. Additionally, in at least some embodiments, one or more of the actuators in each corner of a vehicle may work cooperatively with one or more actuators located at other corners of a vehicle to control the motion of the vehicle.

In certain embodiments, an actuator may be a component or apparatus that may be used to apply a desired force to a structure in order, for example, to move it relative to the ground or relative to a second structure. In some embodiments, a linear hydraulic actuator includes a single or a double-acting hydraulic cylinder with a piston that is slidably received in the cylinder and a piston rod that is attached to the piston on one side. In some embodiments, a hydraulic pump, operatively coupled to an electric motor, may be used to drive the pump to supply hydraulic fluid to the hydraulic cylinder in order to apply pressure on at least one side (i.e. face) of the piston. This applied pressure may result in a force along the axis of the piston rod that is proportional to the Effective Force Area (EFA). Typically, the EFA on the side of the piston attached to the piston rod is the annular area that is equal to the difference in the cross-sectional area of the piston and the piston rod. On the opposite side of the piston, the EFA is typically the cross-sectional area of the piston.

When multiple actuators are interposed between two structures and positioned operatively in a parallel orientation to each other, the Total EFA (TEFA) in an extension or compression direction may be the sum of the EFA of all the actuators. However, if there is a low pass filter between, for example, the compression volume and/or the extension volume of an actuator and an associated pump, the EFA of the actuator in the compression and/or the extension directions may be a function of the frequency of the pump output.

External pistons that encircle the housing of a linear actuator also have an EFA in the compression and/or the extension directions corresponding to the effective surface areas oriented perpendicular to the axis of the external piston exposed to the pressurized fluid.

If a low pass filter is situated between a pump and an actuator, the actuator may be less responsive at higher frequencies. Therefore, the presence of a low pass filter may have the effect of reducing the TEFA of one or more actuators for a pump output pressure variations at frequencies above a threshold frequency of the low pass filter.

For the purposes of clarity, the embodiments described herein are primarily directed to the use of suspension systems with multiple actuators for controlling the movement of a vehicle body relative to the associated wheels of the vehicle. However, it should be understood that the embodiments described herein referencing the connection of an actuator suspension system to portions of a vehicle may be interpreted generally as positioning an actuator, a suspension system, a damper, or any other appropriate hydraulic system between any appropriate corresponding structures as the disclosure is not limited to uses in vehicles.

Turning now to the figures, several non-limiting embodiments are described in further detail. However, it should be understood that the various arrangements of components, features, and methods described relative to the various embodiments may either be used singularly and/or in any desired combination as the disclosure is not limited to any particular embodiment or combination of embodiments.

Figure 2:
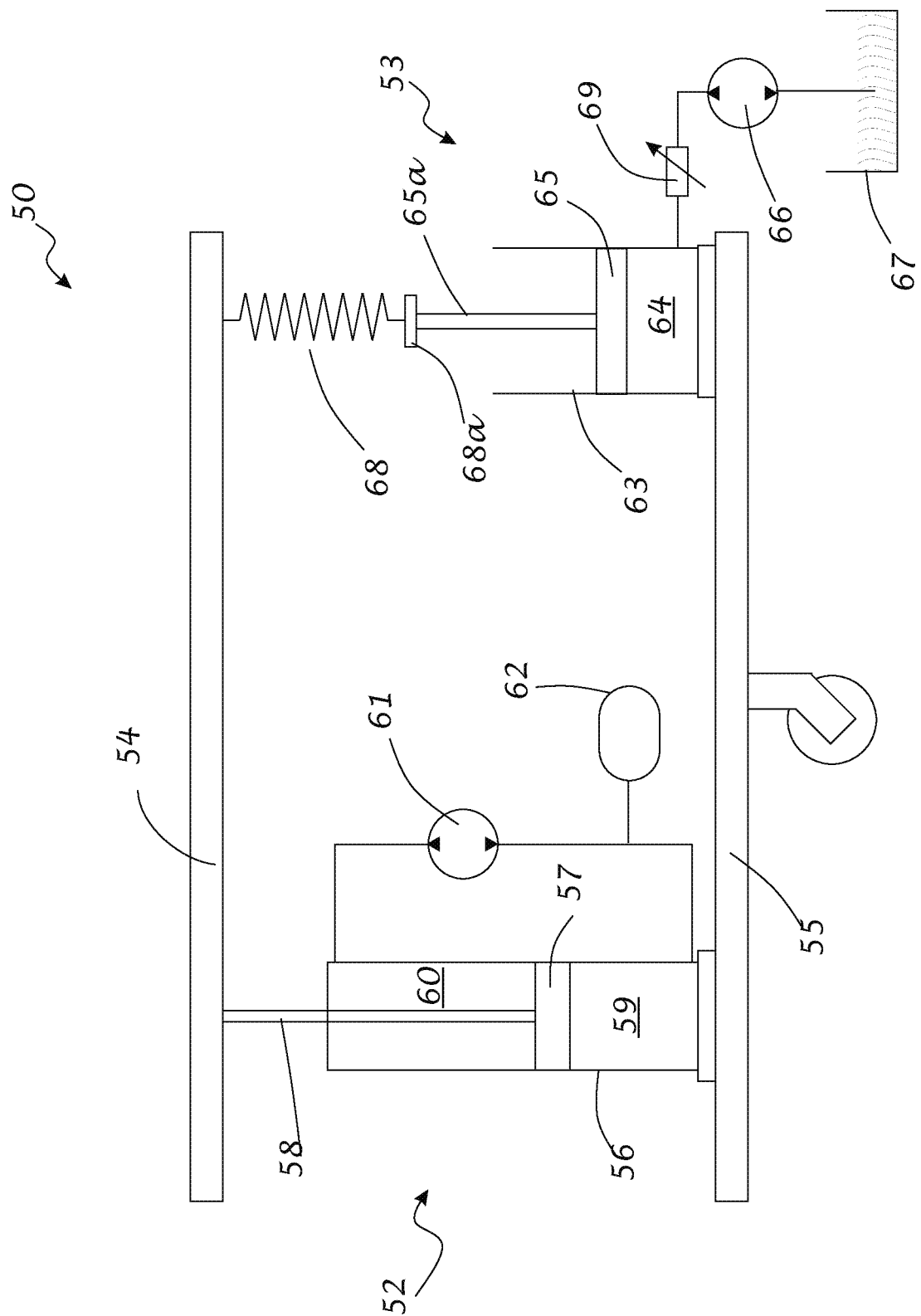
FIG. 2 illustrates a motion control unit with an active suspension actuator and an auxiliary vehicle ride height adjustment actuator supplied by a separate pump.

FIG. 2 illustrates an embodiment of a motion control unit 50 that may be used to control the relative motion of two structures. In the depicted embodiment, the motion control unit includes a first actuator corresponding to an active suspension actuator 52 and a second actuator corresponding to a spring perch (or ride height adjustment) actuator 53. The motion control unit 50 is interposed between, and connected to, a vehicle body 54 and wheel assembly 55. Active suspension actuator 52 is arranged operatively in parallel between the vehicle body and wheel assembly with a series combination of the actuator 53 and a suspension spring 68 also disposed between the vehicle body and wheel assembly. The spring is supported relative to the spring perch actuator by an associated spring perch 68a.

In the depicted embodiment, the active suspension actuator 52 includes a piston 57 that is slidably received in an interior volume of the actuator cylinder 56, and piston rod 58 attached to the piston at a first end. The spring perch 68a is attached to a rod 65a of the spring perch actuator 53 and supports the suspension spring 68. Although in FIG. 4, spring 68 is shown as a coil spring, any appropriate compliant spring like component or device such as, for example, an air spring, may be used as the disclosure is not so limited. In FIG. 2, the two actuators are shown as distinct actuators. However, embodiments in which the actuators are integrated with one another are also contemplated as described further below and the disclosure is not so limited.

The interior volume of the actuator cylinder 56 is separated by piston 57 into a compression volume 59 and extension volume 60 located on opposing sides of the piston. The hydraulic motor-pump 61 is in fluid communication with the compression and extension volumes. Accumulator 62 may be sized to at least accept fluid volume displaced by rod 58 as it enters the extension volume during a compression stroke and any increase in the volume of hydraulic fluid as a result of thermal expansion. While a hydraulic motor-pump has been depicted, as noted previously either a hydraulic pump may also be used.

As discussed above, the integrated suspension unit 50 also includes a second actuator 53 such as a spring perch or spring seat. Depending on the embodiment, the second actuator may be a single-sided hydraulic cylinder 63 with hydraulic fluid contained in a compression volume 64 within the cylinder. A piston 65 is slidably received in the interior volume of the cylinder 63. Hydraulic pump 66 may be used to pump fluid from reservoir 67 into the compression volume 64 in order to raise spring 68 which correspondingly raises the vehicle body 54. Alternatively, pump 66 may be used to pump fluid out of compression volume 64 in order to lower vehicle body 54. Alternatively or additionally, fluid may be allowed to drain from volume 64 to reservoir 67 by means of an alternate flow path (not shown) that bypasses pump 66. It is noted that, in some embodiments, pump 66 may be replaced by a hydraulic motor/pump as the disclosure is not so limited. In this case, the motor-pump may be used to recover energy when the vehicle is lowered.

In some embodiments, valve 69 may be located along the flow path between the reservoir 67 and compression volume 64. Depending on the application, the valve may either be, for example, a variable valve or a simple on/off valve. In any case, on the embodiment, the valve may be used to hydraulically lock piston 65 in place in order to keep vehicle 54 in an elevated position such as, for example, when pump 66 is turned off. Thus, the piston may be hydraulically locked by sealing the compression volume by closing valve 69.

During operation, an active suspension actuator 52 may be used to control the relative motion between the vehicle body 54 and wheel assembly 55. The active suspension actuator may also be used to apply a controlled active force (i.e. a force in the direction of motion of the piston 57, relative to the housing of actuator 56) to induce relative motion between the vehicle body 54 and the wheel assembly 55.

As detailed above, active suspension actuator 52 may be operated to control the relative motion between the vehicle body 54 and the wheel assembly 55. Further, the spring perch actuator 53 may be used to adjust the neutral position of the vehicle and the associated wheel assembly. For example, when the hydraulic motor-pump 66 is turned off, the spring perch actuator may maintain the vehicle body at a predetermined neutral position relative to the wheel assembly. This may be accomplished by either applying an appropriate pressure to the compression volume 64, and/or the valve 69 may be locked, in order to maintain the piston at a desired location and the vehicle in the desired neutral position. In some vehicle embodiments, multiple motion control units shown in FIG. 2, may be located at various corners of the vehicle and operated in coordination or individually to move the vehicle body vertically and/or tilt or roll the vehicle body.

In the embodiment in FIG. 2, hydraulic motor-pump 61 and pump 66 may be used synergistically to control movement of the vehicle body 54 relative to the wheel assembly 55. For example, the two actuators may be sized such that they are operated together to raise the vehicle. In such an embodiment, actuator 53 may be sized such work together to lift vehicle body 54. Such a configuration would obviate the need for pump 66 to have sufficient capacity to provide the necessary pressure so that the actuator 53 may support the applied weight of the vehicle.

In some embodiments, a vehicle may have four wheel assemblies supporting a vehicle body, but the disclosure is not so limited. For example, vehicles with additional or fewer wheel assemblies are also contemplated. Further, an integrated suspension unit, such as those described herein, may be interposed between a vehicle body and one or more wheel assemblies, and in some embodiments, each wheel assembly and the vehicle body. Accordingly, in some embodiments, the active suspension system of a vehicle may include four integrated suspension units at the four corners of the vehicle which may be operated in coordination to move the body in unison upward, tilt or pitch the body, or even lift the car with different and/or varying forces.

Figure 3:
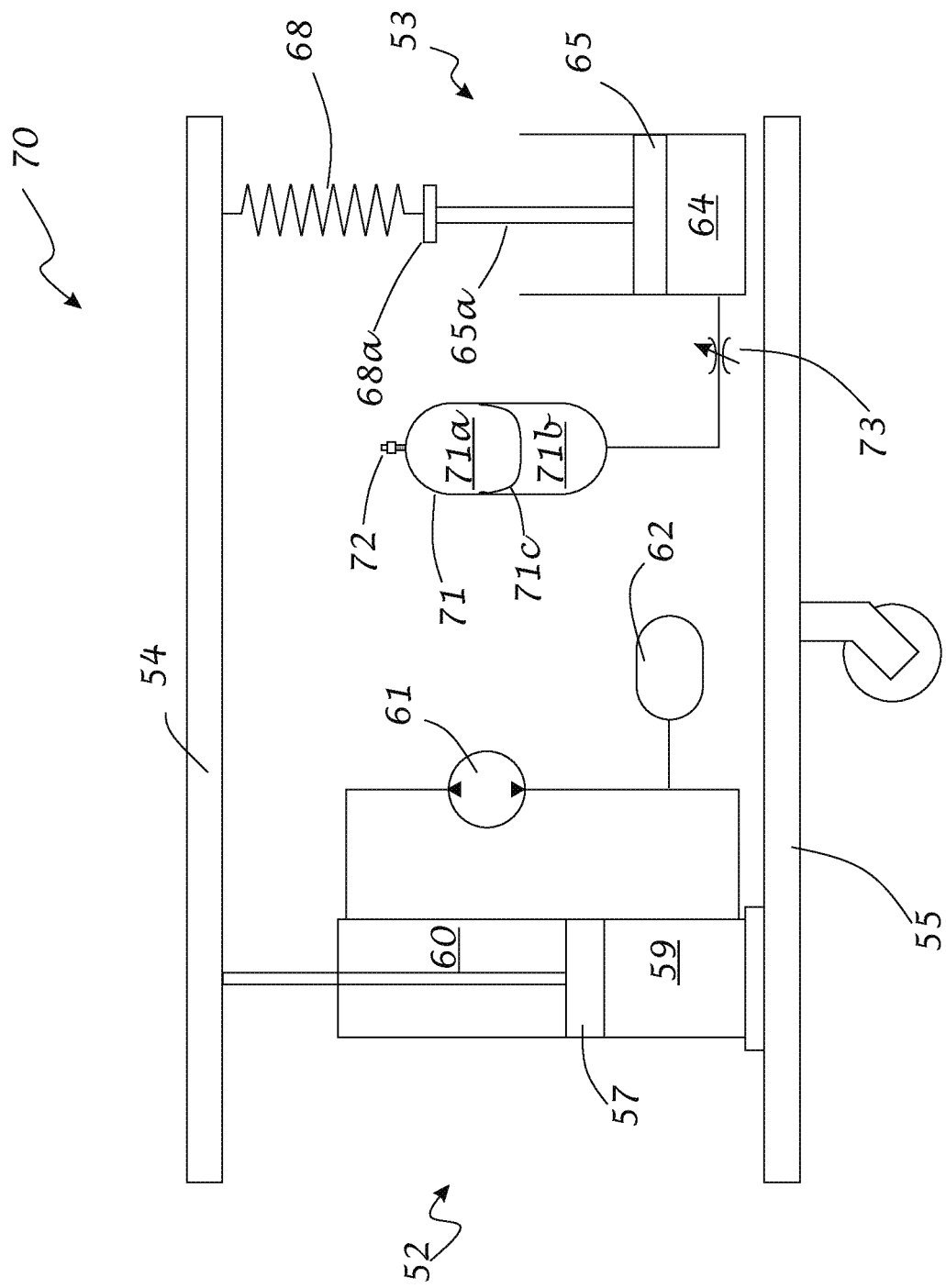
FIG. 3 illustrates a motion control unit with an active suspension actuator and an auxiliary vehicle ride height adjustment actuator pressurized by an accumulator.

Similar to the prior embodiment, FIG. 3 illustrates another embodiment of an integrated motion control unit 70 with an active suspension actuator 52 and spring perch actuator 65. The spring perch actuator piston rod 65a is attached to spring perch 68a, which supports spring 68. However, in this embodiment, compression volume 64 of the spring perch actuator is biased to a predetermined pre-charge by an accumulator 71 that is in fluid communication with the compression volume 64. The pressure of the accumulator, and corresponding size of the piston, may be selected such that the actuator 65 is capable of supporting the fraction of the weight of a vehicle 54 the actuator is associated with. Though pressures, and/or piston sizes, that support either a larger or smaller weight are also contemplated. Accumulator 71 may be partially filled with gas 71a which is separated from the corresponding hydraulic fluid 71b by means of, for example, a diaphragm 71c. Alternatively, a piston (not shown) may be used instead of, or in addition to, the diaphragm to separate the pressurized gas from the hydraulic fluid. A valve 72 located on an exterior of the accumulator may be used to add gas or remove gas from the accumulator internal gas volume.

A flow control device 73 may be used to regulate the exchange of hydraulic fluid between the compression volume 64 and the accumulator 71. The flow control device may be, for example, any appropriately controllable valve, such as an electrically or hydraulically actuated valve. Alternatively or additionally, an on/off valve may be used, such as for example, a solenoid valve (not shown). Additionally, or alternatively, a flow restriction or multi-position valve may be used. A multi-position valve may include check valves, restrictions, or other flow control devices. During operation of the embodiment in FIG. 5, the vehicle 54 may be lowered by opening flow control device 73 so hydraulic fluid may flow between compression volume 64 and the accumulator 71b. In instances where the pressure in the accumulator and piston are sufficient to support the vehicle, when lowering the vehicle 54, the hydraulic motor-pump 61 may be used to increase pressure in the extension volume 60 and reduce pressure in the compression volume 59. The force resulting from the weight of the vehicle in conjunction with the differential pressure across piston 57 will overcome the force applied on piston 65 by the fluid in compression volume 64 supporting the vehicle. The resulting net force causes the vehicle to move down, thus forcing fluid out of the compression volume 64. Alternatively, in another mode of operation when it is desired to raise the vehicle, while flow control valve 73 is open, the hydraulic motor-pump 61 may be operated to reduce the pressure in the extension volume 60 relative to the pressure in the compression volume 59. In this case, the force resulting from differential pressure across piston 57 in conjunction with the force due to the pressure in compression volume 64 may be used to raise the vehicle, i.e. increase the vehicle ride-height.

As noted above, in some embodiments, the pressure in accumulator 71 and size of piston 65 may be selected so that the force applied on piston 65 due to the pressure in compression volume 64, when flow control device 73 is open and hydraulic motor-pump 61 is not being driven, is sufficient to support the force resulting from the weight of the car. It should be understood that the weight of the car may be supported by one or more integrated suspension units, such as the suspension unit 70 in FIG. 3. In such an embodiment, the integrated suspension unit would support a corresponding portion of the vehicle weight. It is noted that when pump 61 is turned off, the pressures in volumes 59 and 60 will eventually equilibrate. However, there will be a net force in the upward direction due to the difference in piston area exposed to the pressure in volumes in volumes 59 and 60 (i.e. the difference in the EFA in the extension and compression directions).

Figure 4:
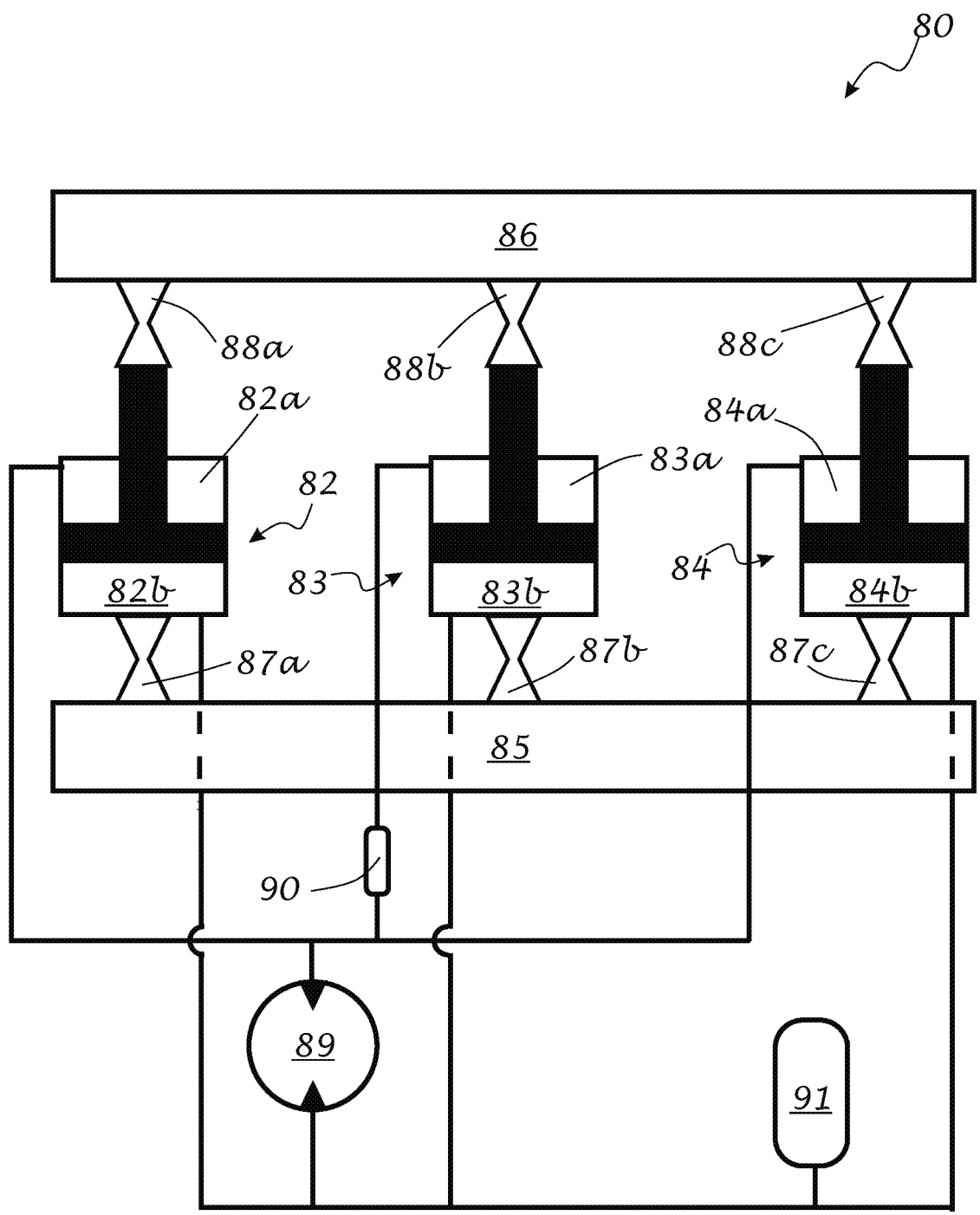
FIG. 4 illustrates a motion control unit including three double-acting actuators.

FIG. 4 illustrates an embodiment of an integrated motion control unit 80 that includes a first actuator 82, a second actuator 83, and a third actuator 84. These actuators are interposed between a first structure 85 and a second structure 86. The actuators may be used to actively and/or passively control the relative motion, between the two structures. In some embodiments, these actuators may be operated in different frequency ranges. These frequency ranges may either be separate from one another, or they may include overlapping frequency ranges, as the disclosure is not so limited. Each actuator may be connected to the opposing structures by one or more connecting devices 87a-87c and 88a-88c that may be located on opposing sides of the actuators. In some embodiments, one or more of the connecting devices may be, or at least include, a spring and/or a damper. In some embodiments, one or more of the connecting devices may be, or at least include, a rigid linkage.

As elaborated on further below, in some embodiments, the three actuators depicted in FIG. 4 may be, directly or indirectly, driven by a single pump. This pump may also be operated in combination with one or more gas pressurized accumulators. Although three actuators are shown in FIG. 4, any number of actuators may be used including two actuators or more than three actuators may be used, as the disclosure is not so limited.

In the embodiment in FIG. 4, each actuator has a compression volume and an extension volume that contains hydraulic fluid whose pressure is controlled, either directly or indirectly, by a hydraulic pump. The extension volumes of actuators 82, 83, and 84 are 82*a*, 83*a*, and 84*a* respectively, while the compression volumes are 82*b*, 83*b*, and 83*b* respectively. In the embodiment in FIG. 4, the pump 89 may be used to directly control the pressure in either or both of the compression and extension volumes in at least actuator 82 and actuator 83 by supplying hydraulic fluid to one or both of the compression and extension volumes in actuator 82 and actuator 83. In some embodiments, the pump may also be used to supply pressure to the extension and compression volumes of actuator 84 as well, though embodiments in which a separate pressure source is used are also contemplated. As depicted in the figure, a low pass hydraulic filter 90 may be located in the flow path between the pump and compression and/or extension volumes of one or both of actuator 82 and actuator 83. The filters may either be located on a single flow path associated with either one, or both, of the extension or compression volumes of an actuator. Further, the filters may be used to control the frequency response of the actuators relative to changes in the pressure applied to the flow paths by the pump. For example, the one or more filters may be configured such that the first actuator 82 responds more slowly to pressure changes applied by the pump than the second actuator 83 (i.e. the hydraulic filters associated with the first actuator may have a lower operational frequency threshold than the second actuator).

In some embodiments, one or more of the compression and extension volumes in the third actuator 84 may be supplied directly by the pump 89 and/or by a pressurized accumulator 91. A low-pass hydraulic filter may also be used to affect the frequency response of actuator 84. Depending on the particular application of each of the above noted actuators, as well as the actuators described below, are intended for, the low pass hydraulic filters may be tuned to a particular frequency threshold. For example, a filter may be tuned to permit operation of an actuator at frequencies corresponding to the various types of events described previously. These events include, but are not limited to: a wheel event or motion frequency; a body event or motion frequency; vehicle movement frequencies corresponding to maneuvers such as turns, accelerations, and decelerations; ride height adjustment frequencies; and other appropriate movement threshold frequencies.

Figure 5:
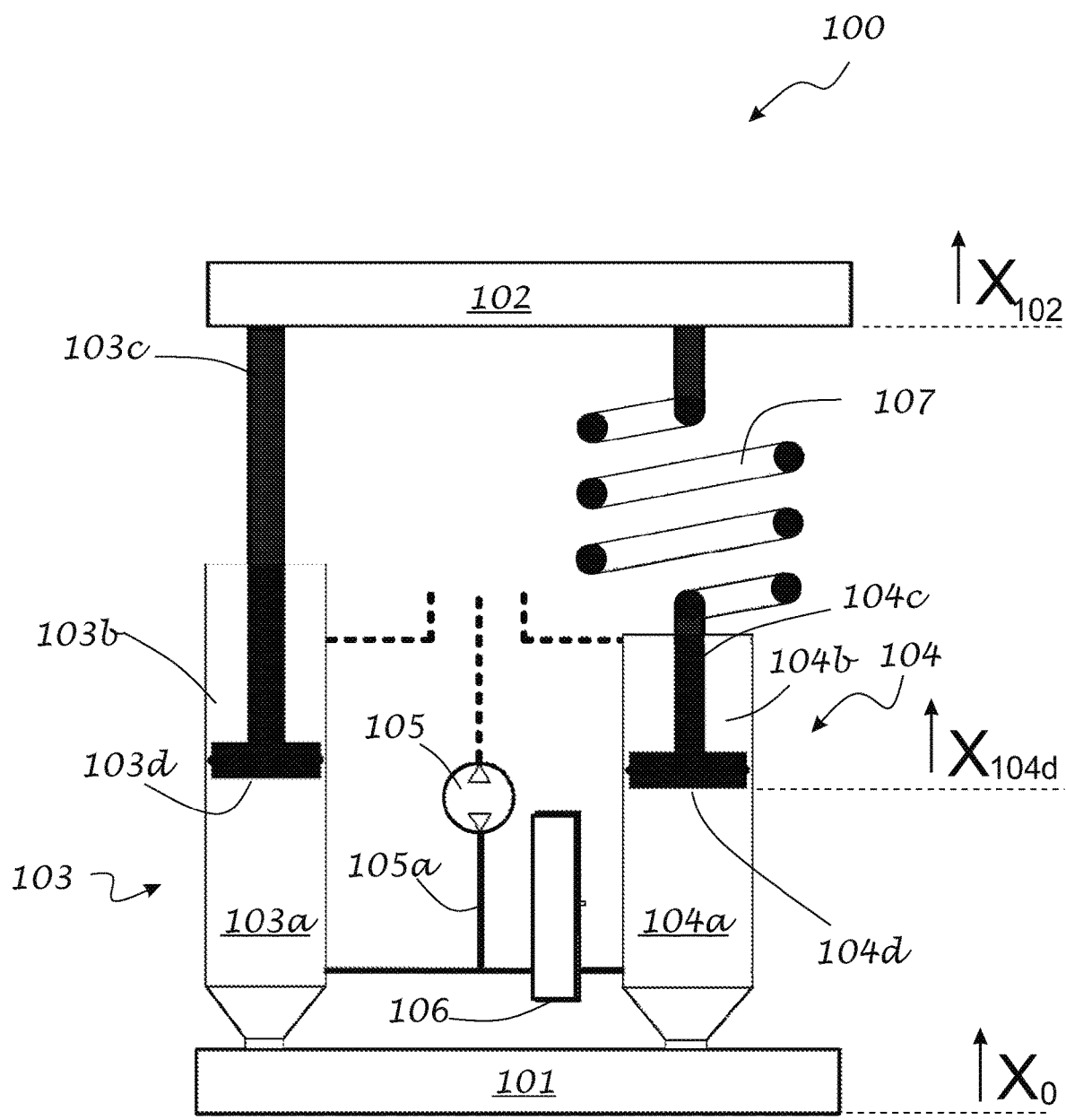
FIG. 5 illustrates a motion control unit including two actuators supplied by a single pump where the actuators have different frequency responses.

FIG. 5 illustrates an embodiment of a motion control unit 100 interposed between two structures 101 and 102 that may be moved relative to each other. The motion control unit includes actuator 103, with compression volume 103*a* and extension volume 103*b*, and actuator 104 with compression volume 104*a* and extension volume 104*b*. A hydraulic pump 105 may be used to supply hydraulic fluid to at least volumes 103*a* and 104*a*. In the depicted embodiment, both actuators may be rigidly connected to structure 101. The piston rod 103*c* may be rigidly connected to structure 102, Alternatively there may be a compliant device such as a suspension system top mount (not shown). A piston rod 104*c* is connected to structure 102 by means of connection device 107, which in this embodiment is a spring. A hydraulic flow control device 106 may be used to alter the frequency response of actuator 104 to changes in pressure caused by pump 105. This flow control device may be, for example, an electronically controlled valve, a passive check-valve, or a multi-position valve as described above. This flow control device may also act, in conjunction with the flow channel, and/or other hydraulic components, to form a hydraulic low pass filter, regulating the change in pressure of chamber 104*a* with respect to the pressure caused by pump 105 similar to the embodiments described above. It is noted that the dashed flow paths in FIG. 5 are flow paths that may flow to other devices such as accumulators and/or may be connected to each other depending on the particular embodiment.

In some embodiments, in order to achieve a particular frequency response of actuator 104, a walled orifice restriction may be used as a flow control device 106. This thin-walled orifice restriction may be designed as follows:

The force exerted by actuator 103 may be determined by a pressure in chamber 103*a*, $P_{103a}$, and the piston area, $A_{103d}$, indicated as 103*d* in FIG. 5. The force exerted by actuator 104 may be determined by either the pressure in chamber 104*a*, $P$ 104*a*, acting on the piston area, $A_{104d}$, labeled as 104*d*, or the compression of the series spring 107. Since these two elements are in series, they exert the same linear force as described in Eq. 1 below, $$F_{104} = P_{104a}A_{104d} = K_{107}(x_{104d} - x_{102}) \qquad \text{(Eq. 1)}$$

where $F_{104}$, is the force from actuator 104, $K_{107}$, is the stiffness of spring element 107, and $x_{104d}$ and $x_{102}$ are the positions of actuator piston 104*d* and body element 102. Taking the first derivative of equation 1 shows that for actuator 104 the rate of change in force may be associated with a flow rate, $Q_{106}$, across a hydraulic flow control device 106.

$$\frac{dF_{104}}{dt} = K_{107}\frac{d(x_{104d} - x_{102})}{dt} = K_{107}\frac{Q_{106}}{A_{104d}} \qquad \text{(Eq. 2)}$$

A typical thin-wall orifice restriction has flow characteristics that may be related to a difference in pressure across the feature. Eq. 3 describes the fluid flow rate across an orifice element that may be used as a hydraulic flow control device 106. Here, $\rho$, is the density of the fluid, $A_{orifice}$ is the area of the flow restriction, and C is the discharge coefficient for a particular orifice geometry which may be determined empirically.

$$Q_{106} = CA_{orifice}\sqrt{\frac{2(P_{104a} - P_{105a})}{\rho}} \qquad \text{(Eq. 3)}$$

The two actuators 103 and 104 may respond to a pressure created by pump 105 in different ways due to the hydraulic flow control device 106, which as noted above may be a flow restriction. Equations 4 and 5 show a change in force response per unit time for actuator 103 and actuator 104 to pressure changes caused by the pump. The response of actuator 103 may be directly controlled by the pressure change in the pump (while neglecting line-losses in the connection between 105 and 103*a*). However, the force response of actuator 104 may be restricted based on the parameters of the orifice used as an example of a flow control device.

$$\frac{dF_{103}}{dt} = \frac{dP_{105a}}{dt}A_{103d} \qquad \text{(Eq. 4)}$$

$$\frac{dF_{104}}{dt} = \frac{K_{107}CA_{orifice}}{A_{104d}}\sqrt{\frac{2(P_{104a} - P_{105a})}{\rho}} \qquad \text{(Eq. 5)}$$

Equation 5 shows that the response rate of actuator 104 may be controlled using the parameters associated with the flow control device as well as the series spring element 107.

Additional consideration for the mass associated with the fluid in the flow path may be taken into account in the model. However, in some applications, an effect of this may be readily determined experimentally or through computational fluid dynamic simulations of the fluid system instead.

Figure 6:
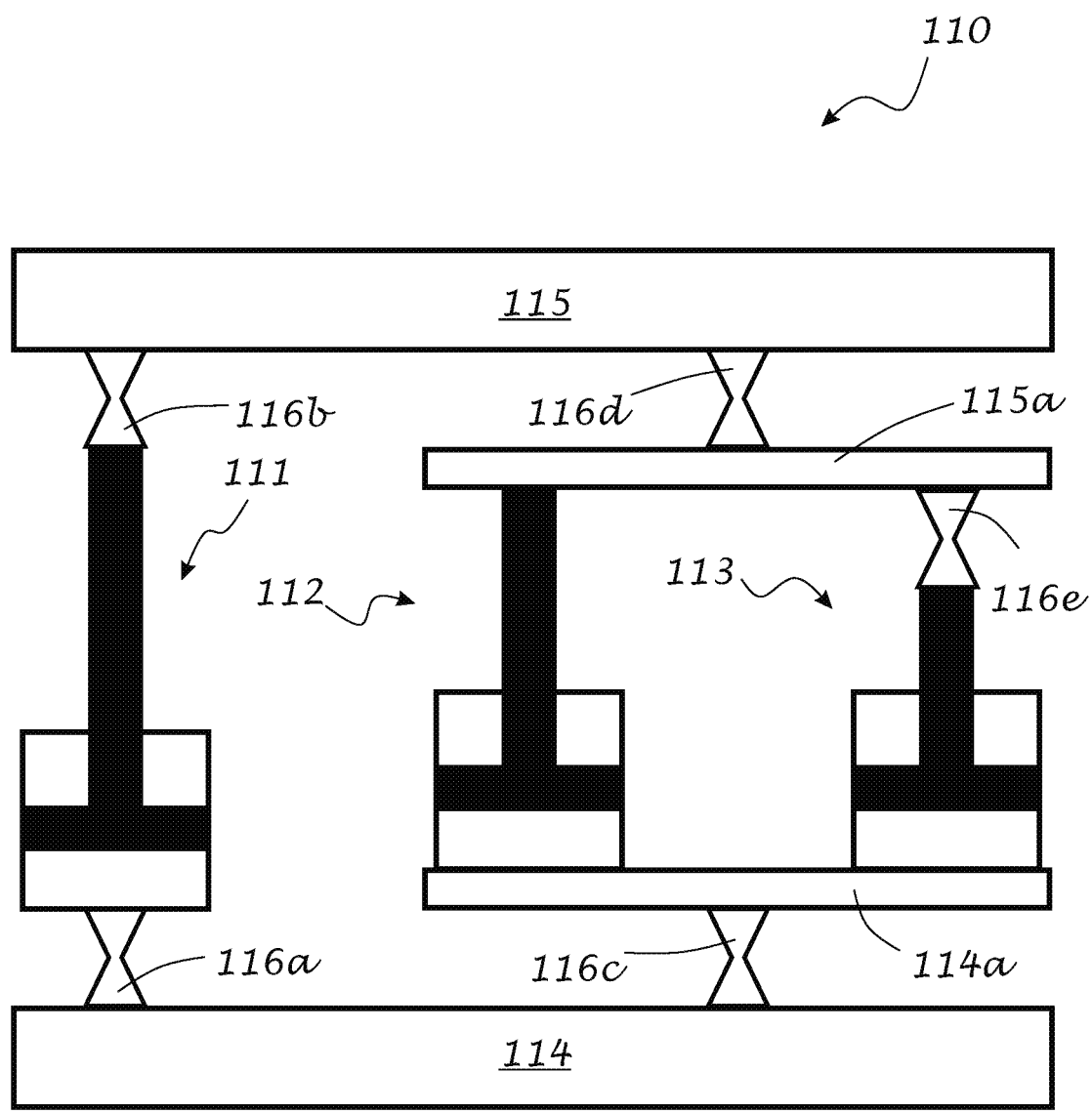
FIG. 6 illustrates another embodiment of a motion control unit with three actuators operating with different frequency responses.

FIG. 6 illustrates an embodiment of a motion control unit 110 that includes three actuators 111, 112, and 113. The three actuators may be coordinated to control the relative motion between first and second structures 114 and 115. In this embodiment, actuators 112 and 113 are ganged together by first and second intermediate structures 114a and 115a. Connecting devices, 116a and 116b may be used to connect actuator 111 to the first and second structures 114 and 115 respectively. Connecting devices 116c and 116d may be used to connect the first structure and first intermediate structure 114 and 114a, and the second structure and second intermediate structure 115 and 115a respectively. In some embodiments, a connecting device 116e may be used to connect the piston rod of actuator 113 to the second intermediate structure 115a and the opposing end of the actuator is connected to the first intermediate structure using any appropriate connection. The opposing ends of the actuator 112 are connected to the two intermediate structures operatively in parallel with the third actuator 113. Similarly, the first actuator is operatively in parallel with the ganged together second and third actuators. Further, it should be understood that each of the depicted connecting devices include at least one of a spring a damper, and/or a rigid connection.

In some embodiments, structure 114 may be the wheel assembly of a vehicle while structure 115 may be a vehicle body. Correspondingly, actuator 111 may be an active suspension actuator, actuator 112 may be a roll assist actuator, and actuator 113 may be a ride height adjustment actuator.

Figure 7:
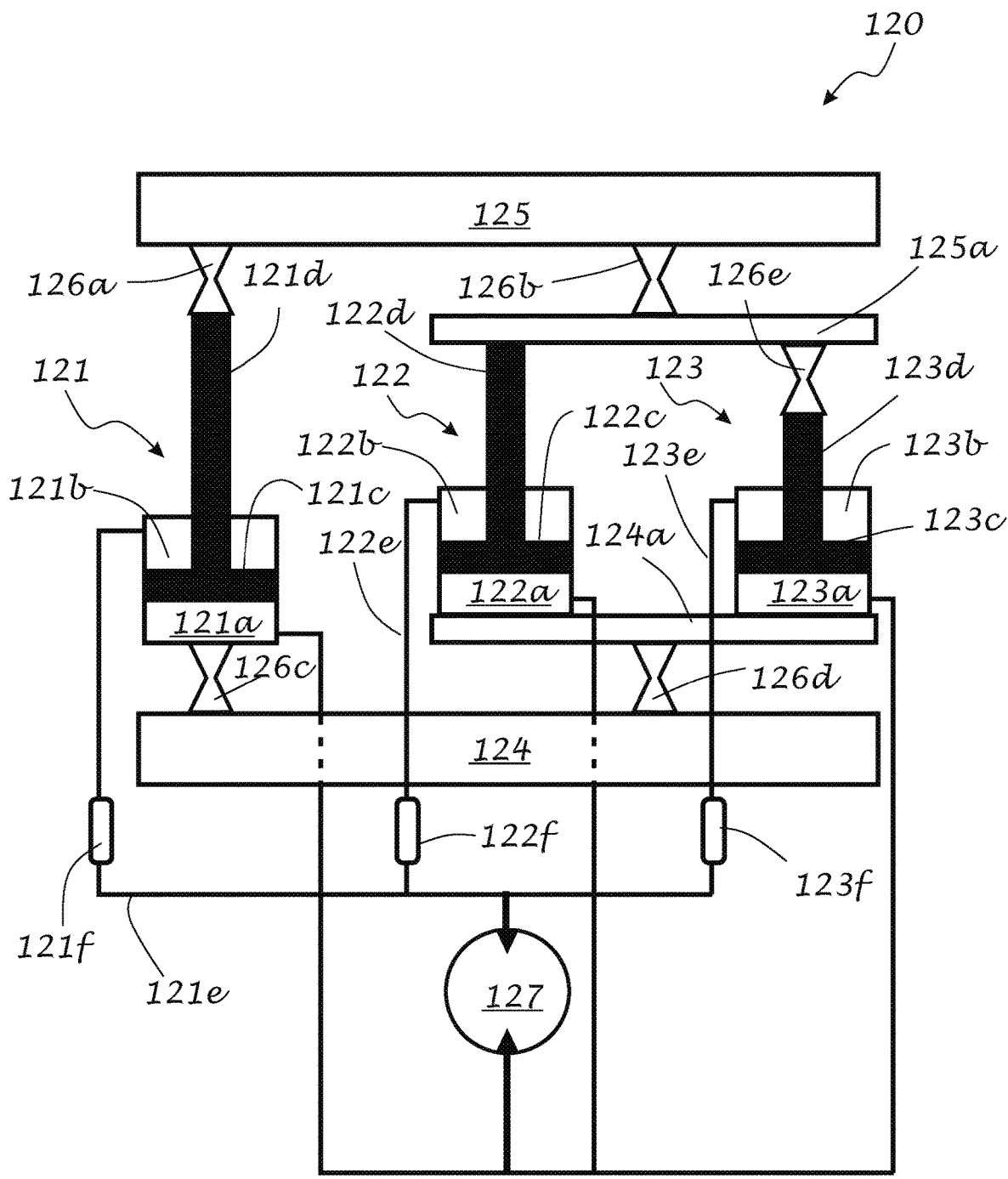
FIG. 7 illustrates another embodiment of a motion control unit with three actuators operating with low pass hydraulic filters and a single pump.

The embodiment shown in FIG. 7 is an example of a motion control unit 120 that includes three actuators, 121, 122, and 123 arranged in a configuration similar to that described above in regards to FIG. 6. These actuators work cooperatively to control the relative motion between structure 124 and structure 125. Actuator 121 includes a compression volume 121a, an extension volume 121b, and a piston 121c which is attached to piston rod 121d. Actuator 122 includes a compression volume 122a, an extension volume 122b, and a piston 122c that is attached to piston rod 123d. Actuator 123 includes a compression volume 123a, an extension volume 123b, and a piston 123c that is attached to piston rod 123d. In this embodiment, each compression volume may be connected to an accumulator not shown) that may compensate for the volume of oil that is displaced by piston rod intrusion during operation. In the embodiment in FIG. 9, the extension volumes 121b, 122b, and 123b are in fluid communication with a first port of the hydraulic pump 127 by means of fluid flow paths 121e, 122e, and 123e respectively. Flow paths 121e, 122e, and 123e may include low pass hydraulic filters (and/or flow control devices) 121f, 122f, and 123f respectively.

Hydraulic actuators 122 and 123 are ganged together by structures 124a and 125a. Connecting devices 126a, 126b, 126c, 126d, and 126e connect piston rod 121d to structure 125, structure 125 to structure 125a, actuator 121 to structure 124, structure 124 to structure 124a, and piston rod 123d to structure 125a. Connecting devices 126a, 126b, 126c, 126d, and 126e may be any appropriate combination of spring, damping and rigid elements.

In the depicted embodiment, low pass hydraulic filters 121f, 122f, and 123f are positioned along the associated flow paths between the pump 127 and one or more of the compression and extension volumes of one or more of the first, second, and third actuators 121, 122, and 123. In some instances, low pass filters may be associated with both the extension and compression volumes of a specific actuator. The specific threshold frequencies associated with the low pass filters may be associated with one or more of these actuators to provide the desired frequency operation. Low pass filters 121f, 122f, and 123f may operate in conjunction with at least the effects of compliance, dissipative component and fluid mass of flow paths 121e, 122e, and 123e to determine the frequency response of the actuators to pressure input produced by hydraulic pump 124a. It is understood that the pump 127 may be a hydraulic motor-pump that may function both as a pump and as a hydraulic motor.

Depending on the particular embodiment, an actuator, or other hydraulic device, may contain at least some of the components may be used as a part of as a low pass hydraulic filter. However, as explained above, in some embodiments, one or more additional components, such as for example, a tuned orifice added to a flow path may interact with the flow path to function as a low pass filter with certain desired characteristics. Additionally, in other embodiments, a flow path may be constructed and/or tuned to function as a low pass filter without the need for any other components. Accordingly, various embodiments with a hydraulic low pass filter should be considered as including any of these possible alternatives, or other appropriate ways of constructing a hydraulic low pass filter, as the disclosure is not limited in this fashion.

Figure 9:
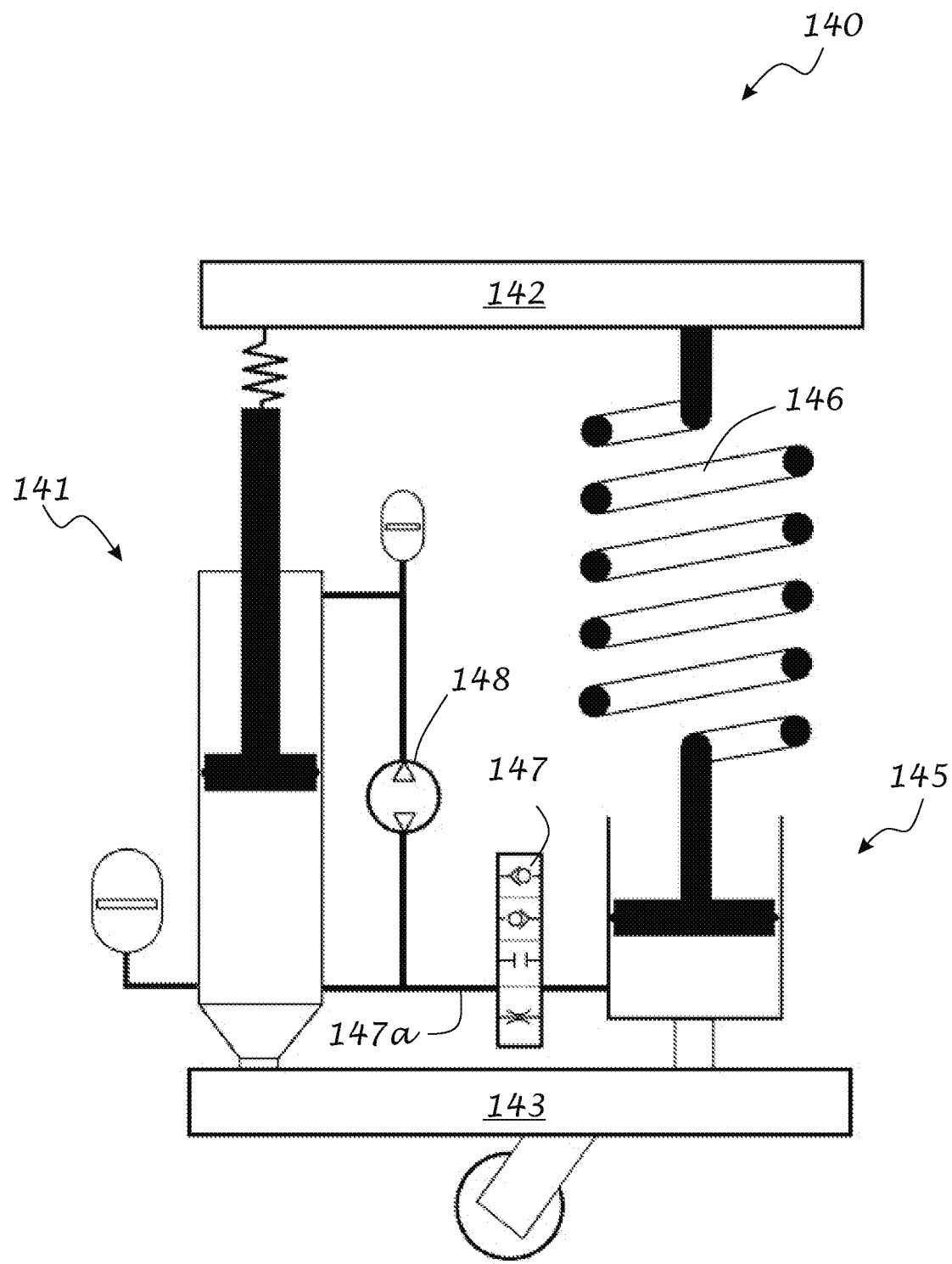
FIG. 9 illustrates a motion control unit with an active suspension actuator and a single-acting vehicle height actuator supplied by a single hydraulic pump.

The embodiment of the motion control unit in FIG. 9 may be a part of an active suspension system of a vehicle where structure 124 is a wheel assembly and structure 125 is a vehicle body. It is understood that, in some embodiments, the vehicle body is supported and its motion controlled by multiple motion control units, such as the motion control unit 120 illustrated in FIG. 9. It is further understood that although the actuators in FIG. 9 are shown to be double acting actuators, one or more single acting actuators may be used instead of or in addition to the actuators shown in FIG. 9 as the disclosure is not so limited.

In some embodiments of a vehicle where the motion control unit 120 is used, low pass filter 121f may be eliminated and the actuator 121 may be operated with a frequency response sufficient to control body and wheel motion at frequencies below 100 Hz. This may be achieved by using an electric motor (not shown) that is operatively coupled to the hydraulic pump 124a to produce pressure input to actuator 121 at frequencies at or below 100 Hz. In such an embodiment, actuator 122 may be used as a roll control actuator to control the roll motion of the vehicle body relative to the road on which the vehicle is traveling. In this embodiment, the low pass filter 122f may attenuate all frequencies above a predetermined frequency, such as, for example, 3 Hz pressure input from the pump and/or from movement of structure 124 relative to structure 125.

In some embodiments, actuator 123 may be used to control the ride height of a vehicle by controlling the nominal or equilibrium distance between a vehicle body and wheel assembly corresponding to structures 124 and 125. In such an embodiment, low pas filter 123f may be used to attenuate all frequencies in the pressure delivered by pump 124a above a predetermined threshold frequency, such as, for example, 0.1 Hz.

While a particular applications and frequency ranges have been noted for the actuators above, it should be understood that the various actuators and low pass filters may be configured to operate in any appropriate frequency range and for any appropriate application including the applications and frequency ranges noted above.

In addition to the above, each of the flow paths 121e, 122e, and 123e, depicted in FIG. 7 may include other or additional flow control devices such as check valves, restrictions, fluid masses, flow limiting devices, and/or shut off valves (not shown) which may be used in conjunction with, or instead of, the depicted hydraulic low pass-filters. For example, flow path 123e may include a shut off valve (not shown) which may be electrically, hydraulically, or pneumatically activated to shut off the flow path and isolate actuator 123 from pressure input from pump 124a. It is understood that the motion control unit in FIG. 9 is shown with three actuators. However, any one of the actuators may be eliminated in some embodiments and/or additional actuators may be added as the disclosure is not so limited.

In some embodiments, flow control devices may be designed and tuned according to the pressures and fluid flow in each system to achieve a desired level of flow mitigation. In one embodiment, a low pass hydraulic filter 122f, or other appropriate flow control device, may be used to effectively limit the range of operation of the associated actuator to a threshold frequency appropriate for mitigating motions with frequencies up to those experienced in a vehicle rolling or pitching (typically between 1 to 3 hz). For example, this flow control device may include a 1 mm diameter thin plate orifice. As pressure is created in pump 127, a force is generated in active suspension actuator, the first actuator 121. The pressure then causes the second actuator 122 to extend against spring element 126b. Before actuator 122 may exert force between structure 125 and 124, fluid flow must occur through element 122f. Therefore, by simply creating a tuned restriction (i.e. with a desired relationship between pressure drop and flowrate), which may correspond to the filter 122f, the second actuator 122 may be limited to generating forces between structures 125 and 124 at frequencies below a threshold frequency associated with body movements or other appropriate movements. For example, the operation frequency of the second actuator may effectively be limited to less than or equal to 5 Hz, 3 Hz, or any other appropriate frequency. Thus, any pressure fluctuations generated by the pump above this frequency threshold will create a force at actuator 121 but will be attenuated by the filter 122f and thus not generate a force at actuator 122. Again, this attenuation of high frequency pressure variations applied to actuator 122 may reduce both the reflected inertia of the associated pump(s) and/or the power required to pump enough oil to create forces with both actuator 121 and 122 at higher frequencies.

Figure 8:
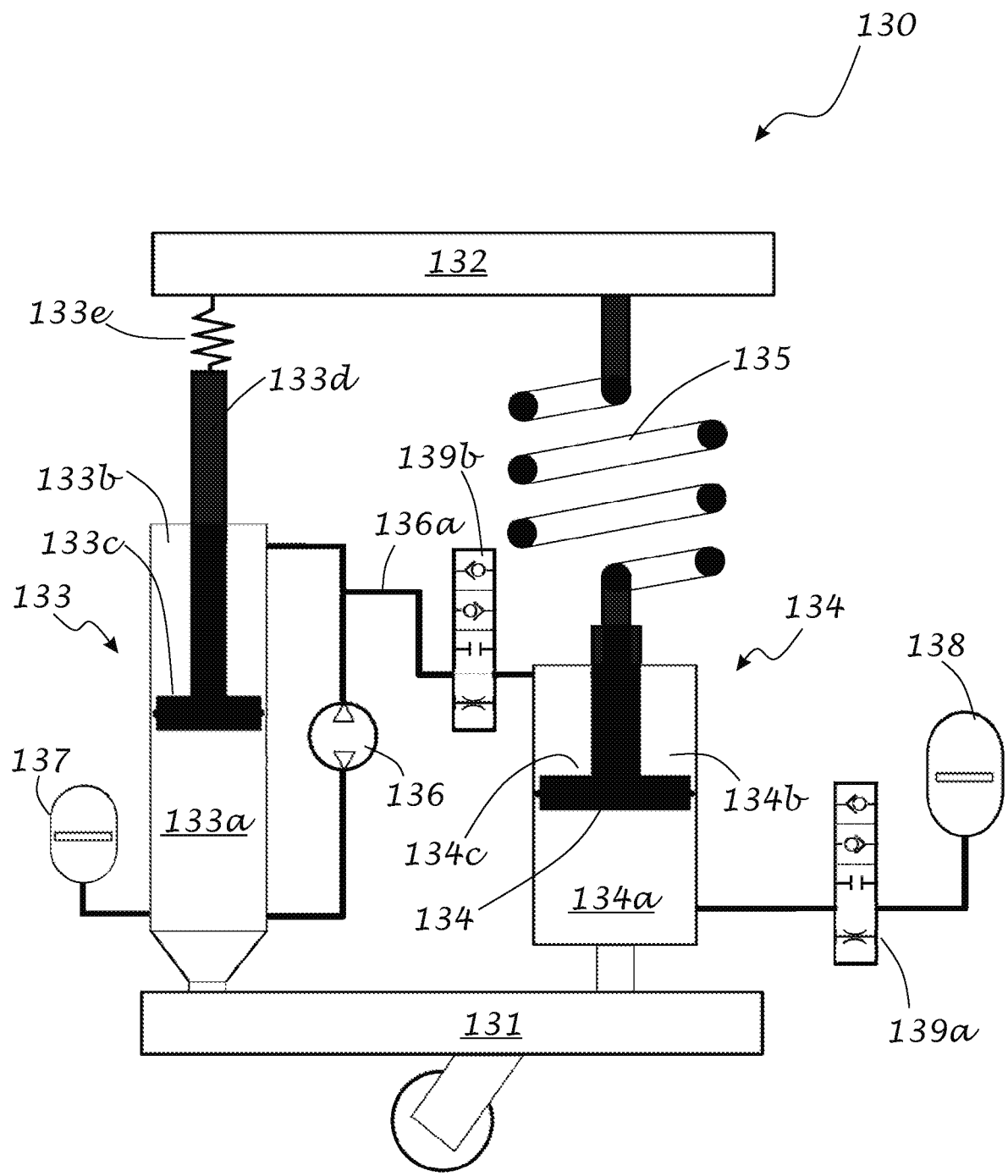
FIG. 8 illustrates an embodiment of a motion control unit with two actuators operating with different frequency responses supplied by a single pump.

FIG. 8 illustrates a motion control unit 130 which controls the relative motion between the wheel assembly 131 of a vehicle and the vehicle body 132. Active suspension actuator 133, is interposed between the vehicle body 132 and the wheel assembly 131. The active suspension actuator may be located to be operatively in parallel with a ride height actuator 134 and suspension spring 135 that are arranged operatively in series with one another between the vehicle body and wheel assembly as well. Actuator 133 includes a compression volume 133a and extension volume 133b that are separated by piston 133c that is connected to the vehicle body by piston rod 133d and an intervening top-mount 133e. Hydraulic pump 136 is operatively connected to an electric motor (not shown) that is controlled to establish a desired pressure differential at a pre-defined frequency across piston 133c. In this embodiment, an accumulator 137 is in fluid communication with compression volume 133a. However, in some embodiments, an accumulator may be incorporated that is in fluid communication with the extension volume as an alternative, or in addition to accumulator 137. The extension volume 133b is in fluid communication with the extension volume 134b of the ride height actuator 134 and one of the two ports of pump 136. The compression volume 134a of actuator 134 is in fluid communication with an accumulator 138, such as a gas charged accumulator. The exchange of fluid to and from compression volume 134a and extension volume 134b may be controlled by flow control devices 139a and/or 139b respectively, which as noted previously may be valve switches including one or more of, check valves, shut-off valves, flow restrictions, or any other appropriate component. The flow control valve 139b, in conjunction with the flow characteristics of the flow channel 136a, may function as a low pass filter in order to attenuate pressure fluctuations produced by the pump 136 above a threshold frequency before they reach the extension volume 134b of the ride height actuator.

Flow control device 139a may be used to regulate the pressure in compression volume 134a by connecting it to pressurized accumulator 138. Pump 136 may be used to control the pressure differential across piston 133c of active suspension actuator 133 in order to control motion of the vehicle body 132 relative to the wheel assembly 131. Flow control devices 139a and 139b may be used to control the pressure across piston 134c. Thus, the differential pressures across piston 133c and piston 134c may be controlled to determine the ride height of the vehicle.

In the embodiment depicted in FIG. 8 actuator 134, as well as other actuators in other embodiments described herein, are described and illustrated to support and adjust the position of a spring perch to affect vehicle roll during turns and/or vehicle height. These spring perches are typically shown as supporting and/or adjusting the position of a suspension spring that is shown as a helical spring. However, these actuators may also be used to apply a roll force by acting on a vehicle's roll bar. One or more actuators in a motion control unit or a suspension control unit may be used to act on a spring perch or a roll bar individually or on both a spring perch and a roll bar simultaneously.

FIG. 9 shows a motion control unit 140 which includes two actuators. An active suspension actuator 141 is interposed between a vehicle body 142 and a wheel assembly 143 operatively in a parallel configuration with a ride height actuator 145. The ride height actuator may be located in an operatively series arrangement with a suspension spring 146 located between the vehicle body and wheel assembly. In this embodiment, the ride height actuator is a single-acting actuator. A pump 148 is in fluid communication with the associated pressurized volumes of the actuators. A flow control device 147 may be disposed between the pump and at least one pressurized volume of actuator 145, which in the depicted embodiment, is a single acting actuator. The flow control device may work in conjunction with the flow characteristics of flow channel 147a to act as a low pass filter in order to mitigate pressure fluctuations applied to actuator 145 above a desired threshold frequency. It should be noted that by choosing the proper characteristics of the flow control device 147, it may be used as a low-pass filter with an appropriate cutoff frequency, so the actuator 145 may be used as a spring perch control actuator to function in an appropriate frequency range (for example, in some embodiments, 3 Hz and below to mitigate vehicle roll forces, or 0.3 Hz and below to create ride height adjustments or compensate for changes in vehicle weight) In some embodiments, actuator 145, the flow control device 147, and flow channel 147a characteristics may be selected to effectively use the actuator for roll control or ride height adjustment. Though embodiments in which other frequency thresholds and/or applications are used are also contemplated.

Figure 10:
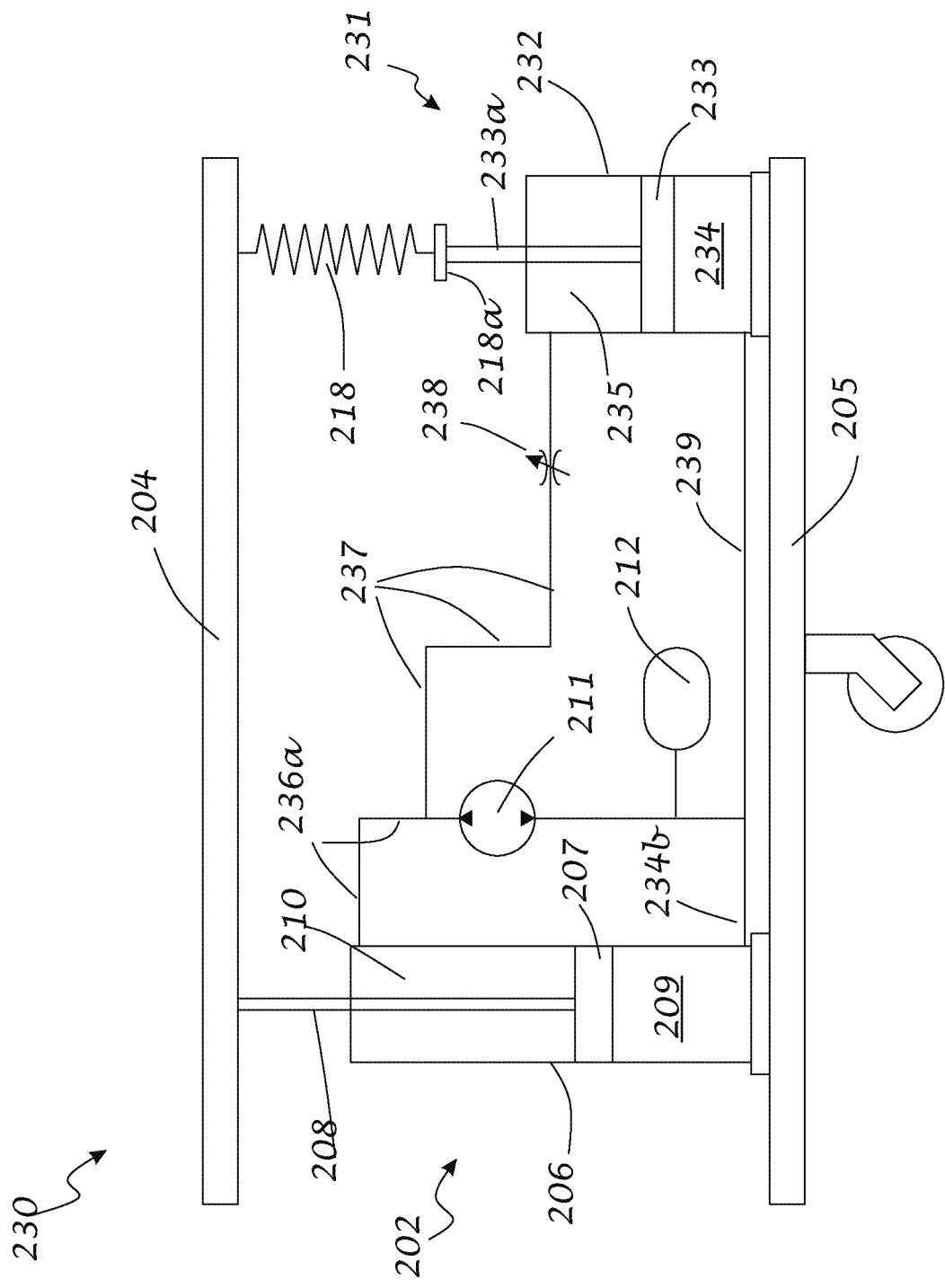
FIG. 10 illustrates another embodiment of a motion control unit with two actuators operating with different frequency responses and supplied by a single pump.

The schematic in FIG. 10 illustrates another embodiment of an integrated motion control unit 230 that includes an active suspension actuator 202 and an auxiliary actuator 231 that work cooperatively to control the relative motion between a vehicle body 204 and wheel assembly 205. In this embodiment, the auxiliary actuator 231 may include a double acting hydraulic cylinder 232 with piston 233 and piston rod 233a, which is attached to spring perch 218a. The spring perch supports spring 218, which supports the vehicle body 204.

As in the previously described embodiments, the active suspension actuator 202 is interposed between the wheel assembly 205 and the vehicle body 204 operatively in parallel with spring 218 and actuator 231 which may be arranged operatively in series with one another. Typically the top of piston rod 208 may be attached to the vehicle body by a top mount (not shown). In the embodiment in FIG. 10, cylinder 232 of the active suspension actuator may include a compression volume 234 and extension volume 235.

In the depicted embodiment, the extension volume 210 of the active suspension actuator 206 and the extension volume 234 of the cylinder 232 of auxiliary actuator 231 may be in fluid communication through one or more conduits such as conduit 236a and conduit 237. The compression volume 209 of the active suspension actuator may be in fluid communication with the compression volume 234 of the auxiliary actuator by means of one or more conduits such as conduits 234b and 239. In some embodiments, a flow restriction, or other component or components, may act as a low pass hydraulic filter along one or both of these flow paths as illustrated by the flow restriction 238 which may be used to regulate the flow of fluid through conduit 237. The restriction may be, for example, an orifice, a manual valve, an electrically controlled valve, a pressure controlled valve, or any other appropriate or convenient restriction. Therefore, in some embodiments, the presence of flow restriction 238 working with the flow characteristics of conduits 236a and 237 may act as a low pass filter such that the hydraulic motor-pump may drive the active suspension actuator 202 as a fast response actuator and auxiliary actuator 231 as an actuator with a slower response (i.e. the threshold frequency of the filter limits the operational frequencies of the auxiliary actuator to a frequencies less than at least a maximum operational frequency of the active suspension actuator). Again, such an arrangement may reduce the effective inertia of the system at higher frequencies, while still allowing additional force to be applied at lower frequencies. The force amplification results from the increased area exposed in both pumps to the differential pressure generated by motor-pump 211 at low frequencies, but limits the fluid flow through the pump at higher frequencies.

In some embodiments, the system of FIG. 10 may be configured for use in a typical sedan. In such an application, for example, the resting nominal pressure of the accumulator 212 may be approximately equal to 400-800 psi and the diameter of the piston 207 may be equal to approximately 30 mm-60 mm. Correspondingly, in some embodiments, the area of piston 233 may range from approximately half to triple the area of piston 207.

Figure 11:
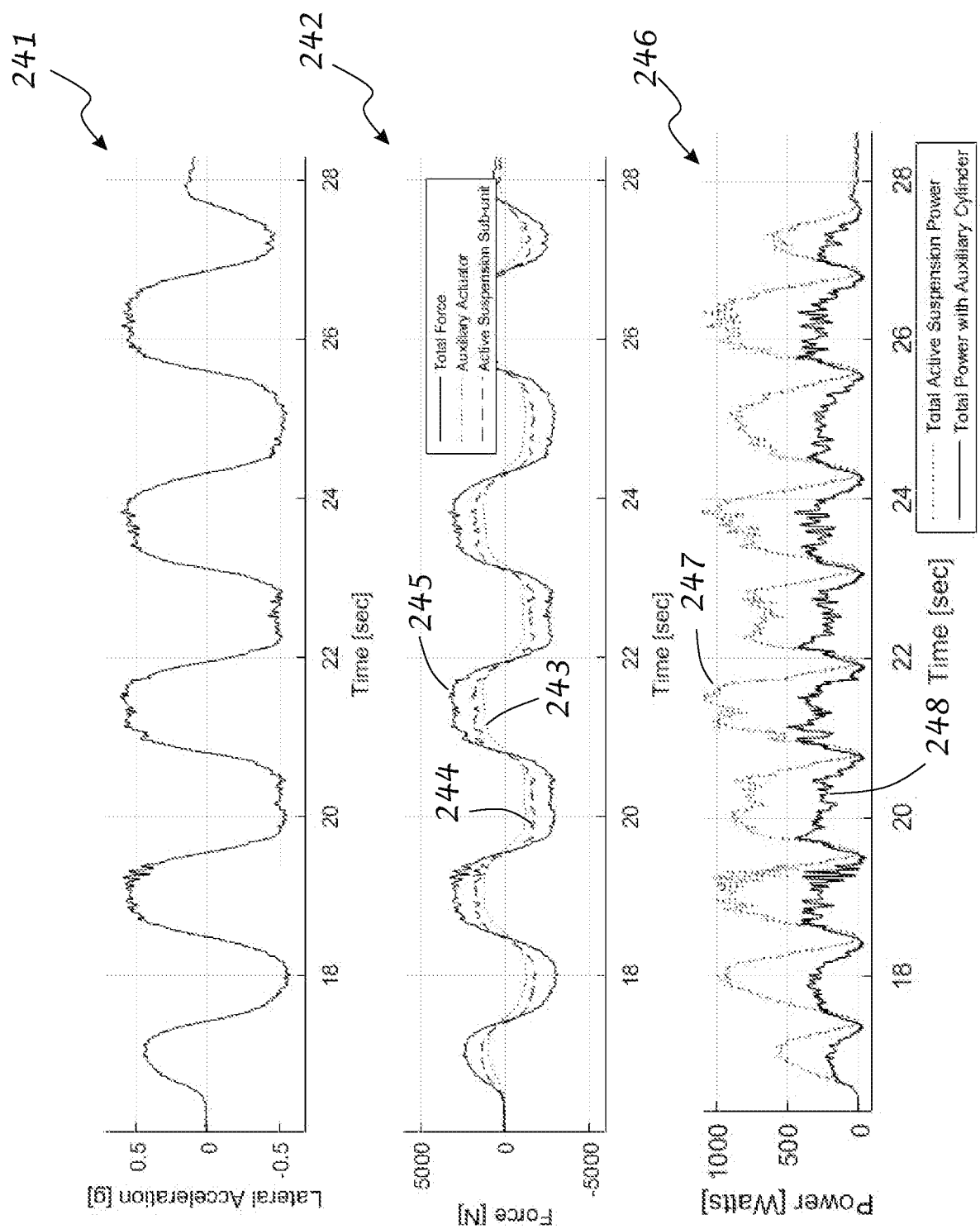
FIG. 11 shows a graph illustrating the power consumption reduction resulting from the use of the motion control unit of FIG. 12.
Figure 12:
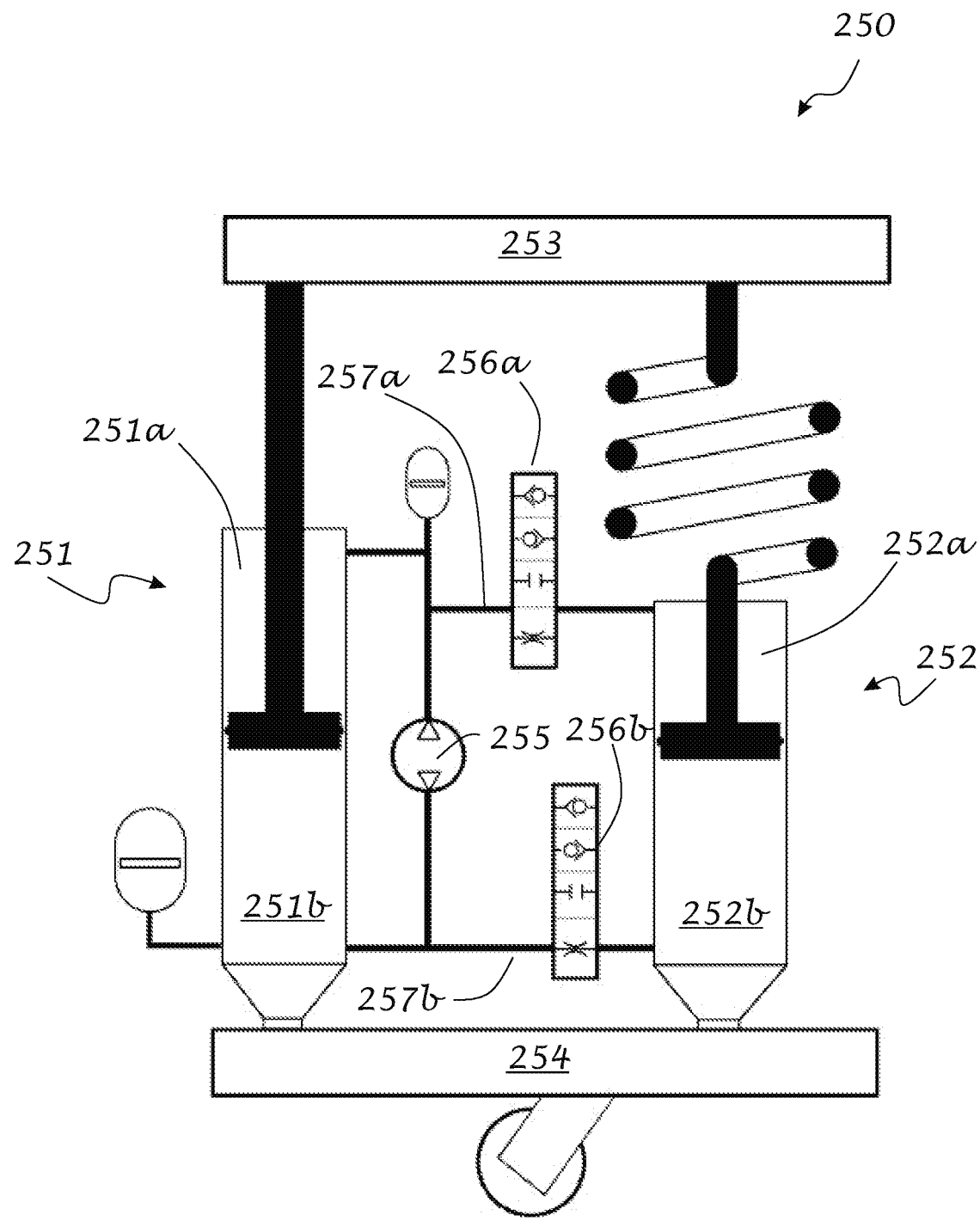
FIG. 12 illustrates another embodiment of a motion control unit with two actuators supplied by a single pump.

FIG. 11 shows an example of the performance of a suspension system constructed according to an embodiment similar to the system depicted in FIG. 12 where a vehicle has an integrated suspension unit at each corner. Graph 241 shows the lateral acceleration achieved by a typical sedan while traveling on a slalom course at 40 mph. This particular sedan has a mass of 1900 kg, track width of 1.6 m, and a center of gravity located at 0.56 m above the ground. In order to achieve full body control (holding the vehicle completely level in the turns) the force required to mitigate vehicle roll on the front right wheel was calculated based on the parameters of the vehicle and lateral accelerations. In this embodiment of the system, the area of the auxiliary actuator piston was 80% of the area of the active suspension system piston. The flow control device was modeled as a flat plate orifice with fluid flow properties tuned to give an approximate 2.5 Hz attenuation frequency of force generation from the auxiliary actuator. Line 245 shows the total force required from the entire active suspension system to achieve ideal body control. Line 247 shows the electrical power consumption required of a representative hydraulic pump, with typical electrical and hydraulic pump loses, working in conjunction with only actuator the active suspension actuator to exert the entire force shown in line 245. The response of a system including both an active suspension actuator, a flow control device, and an auxiliary actuator, where graph 242 shows that the force 243 produced by the auxiliary actuator supplements the force 244 produced by the active suspension actuator. Although the total force generated by both systems is the same in both magnitude and frequency, since the pump did not have to generate as much pressure (it is now acting over a larger area) the required power to perform this maneuver is greatly reduced. Graph 246 shows the electrical power consumed by the electric motor (not shown) to operate the hydraulic motor-pump in both cases. Specifically, the power consumption 247 when the active suspension actuator is acting alone is greater than the power consumption 248 of a system where an active suspension actuator and auxiliary actuator are being operated cooperatively to control the force output.

FIG. 12 shows another embodiment of an integrated suspension unit 250 with a first actuator 251 and a slower response second actuator 252 interposed between a vehicle body 253 and a wheel assembly 254. A first port of a pump 255 is in fluid communication with the extension volumes 251a, 252a. The second port is in fluid communication with compression volumes 251b and 552b of the first and second actuators. Flow control devices 256a and 256b disposed along the flow channels 257a and/or 257b between the pump and extension and compression volumes of the second actuator, in conjunction with the flow channels they are in fluid communication with, may act as low pass filters to mitigate pressure fluctuations above a certain threshold frequency produced by pump 255. The threshold frequency selected for each low pass filter maybe determined, at least in part, by the intended use of the actuator 252. As depicted in the figure, in some embodiments, the second actuator may be located operatively in series with a spring or other connecting device.

Figure 13:
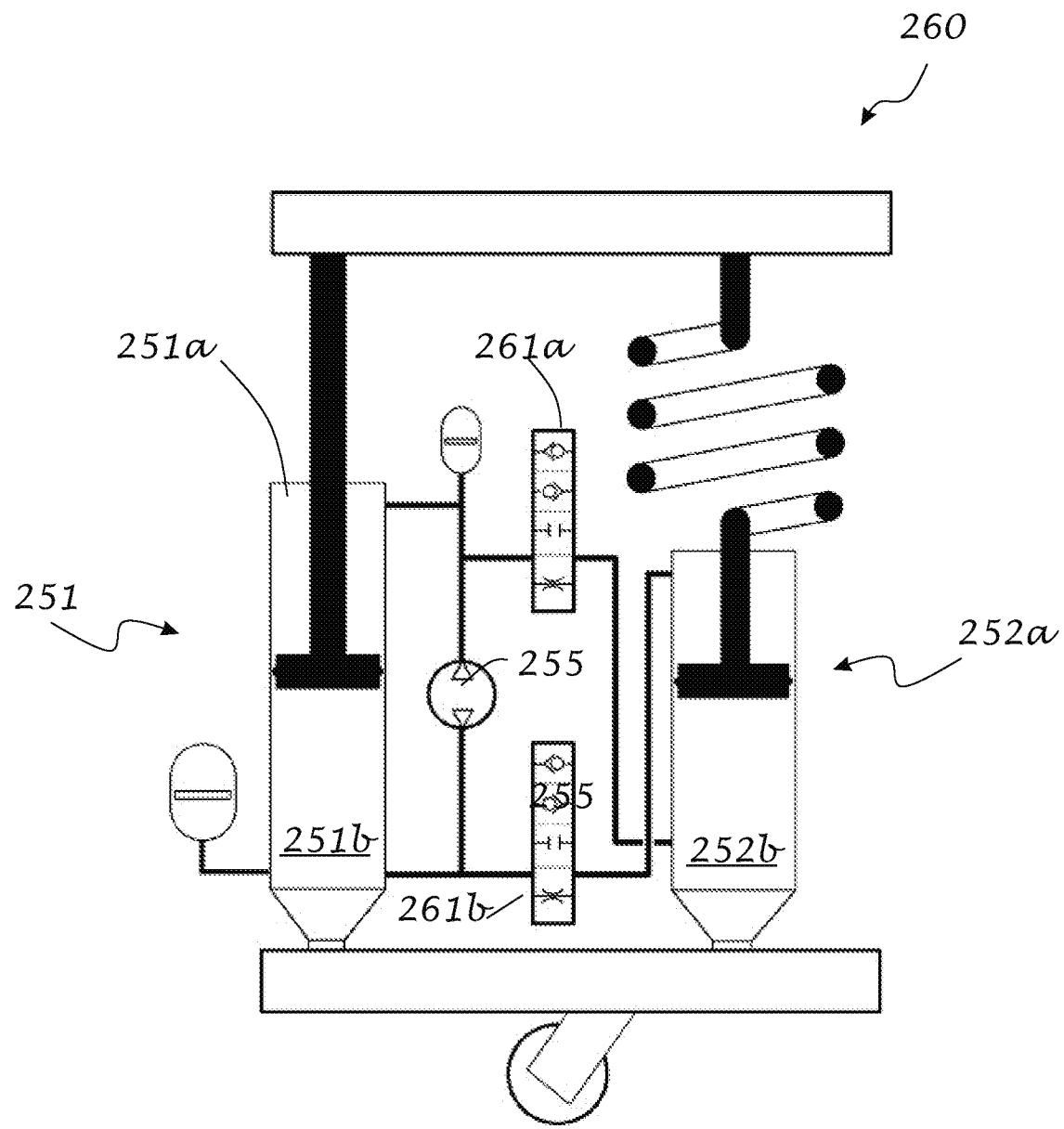
FIG. 13 illustrates the motion control unit of FIG. 14 where the supply to one of the actuators is inverted.

FIG. 13 illustrates another embodiment of an integrated suspension unit 260. In this embodiment, a first port of pump 255 may be in fluid communication with the extension volume 251a of a first actuator and the compression volume 252b of a second actuator. Additionally, a second port of the pump may be in fluid communication with the compression volume 251b of the first actuator and the extension volume 252a of the second actuator. Additionally, one of more flow control devices 261a and/or 261b may be located between the pump and the extension and/or compression volumes of the second actuator to determine a frequency response of the second actuator 252 by attenuation of pressure fluctuations, above a certain frequency threshold.

Figure 14:
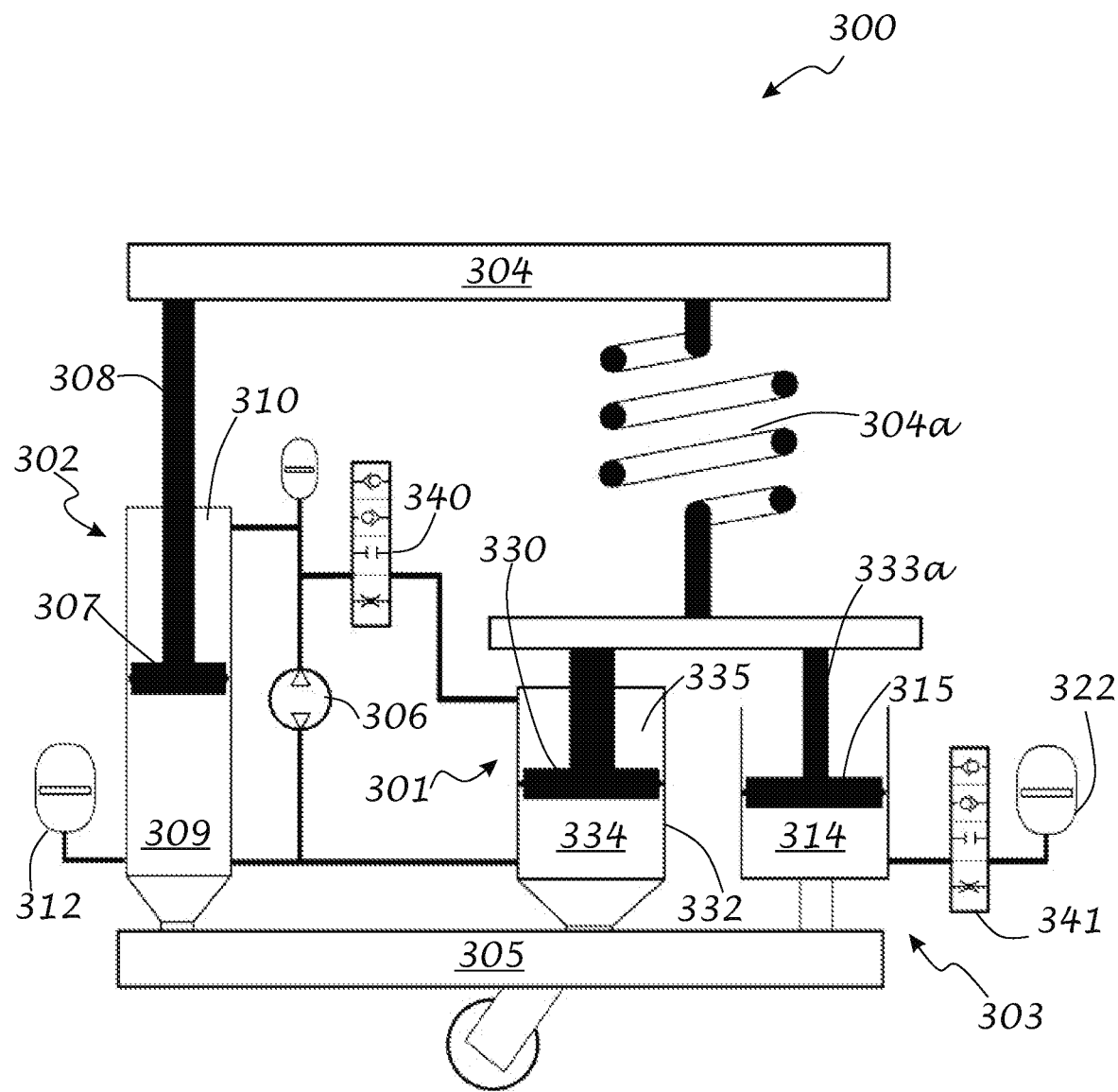
FIG. 14 illustrates a motion control unit with an active suspension actuator, a roll control actuator, and a single acting ride height actuator.

In the embodiment shown in FIG. 14, an integrated suspension unit 300 may include an active suspension actuator 302, an auxiliary actuator 301, and a height adjustment actuator 303. These three actuators may work cooperatively to control the relative motion between the vehicle body 304 and the wheel assembly 305 across a broad range of frequencies as well as adjusting the ride-height of the vehicle. Additionally or alternatively the actuator 303 may be used to assist the auxiliary actuator 301 in its function.

///The active suspension actuator 302 and auxiliary actuator 301 of this embodiment may work cooperatively to control the motion of the vehicle body relative to the wheel assembly. The ride height actuator 303 may work in conjunction with the other two actuators to control ride height and support vehicle weight under static conditions. For example, in some embodiments, the active suspension actuator 302 acts over a broad range of frequencies to mitigate road induced vertical motion imparted to the vehicle body as the vehicle travels over a road, typically 0-50 Hz. The auxiliary actuator 301 may react more slowly, and acts through spring 304a to assist the active suspension actuator 302 by increasing the applied force on the vehicle body 304 and typically operates in frequency ranges below 5 Hz. In some embodiments, the frequency response of the active suspension actuator 302 may be equal to or greater than 50 Hz, while the frequency response of the auxiliary actuator 301 may be equal to or less than 5 Hz.

In some embodiments, if a vehicle is traveling along a curve in the road, one or more auxiliary actuators may increase the leveling force that an integrated suspension unit 300 may apply. For example, if the unit depicted in FIG. 14 is to apply a force in the upward direction, the pressure differentials produced by the pump 306 at frequencies below a desired threshold may be applied to the piston 307 as well as piston 330, increasing the applied force due to the increased effective piston area. However, the response of piston 330 to higher frequency changes in pressure, produced by the motor-pump above the threshold frequency, would be attenuated because flow control device 340 acts as a hydraulic low pass filter as described above.

Figure 16:
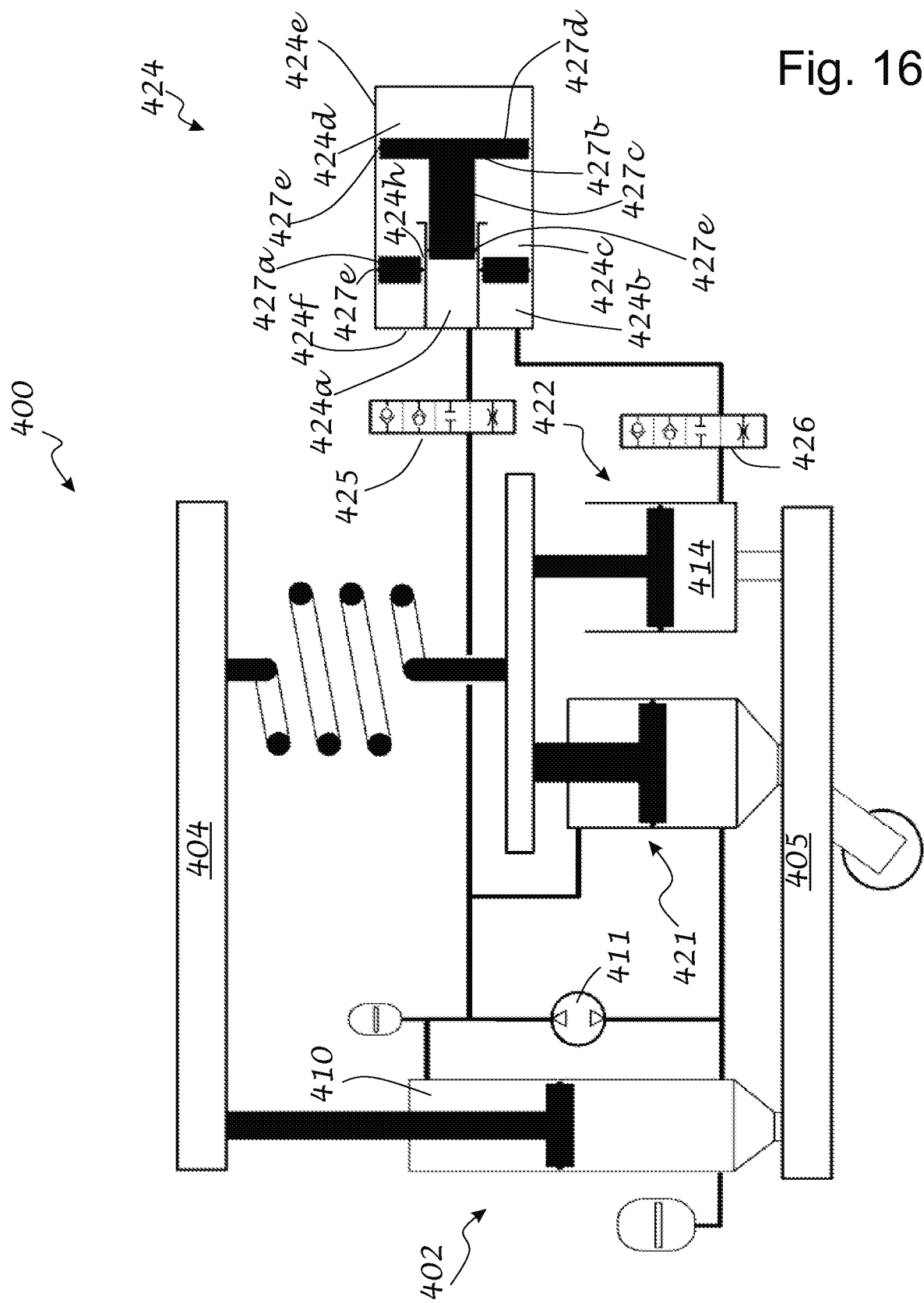
FIG. 16 illustrates another embodiment of a motion control unit with an active suspension actuator, a roll assist actuator, and a height adjust actuator powered by a single pump.

For the embodiment shown in FIG. 16, pistons 330 and 315 are constrained to move together. Therefore, if vehicle ride-height is changed to a new neutral position, the flow control device 341 may be closed to lock piston 315 in that new position. However, if the auxiliary actuator 301 is engaged to, for example increase roll hold capacity, an associated flow control device 341 disposed between a pressurized accumulator 322 and the compression volume 314 of the height adjustment actuator 303 may then be at least partially opened to allow piston 330 to move up or down.

Figure 15:
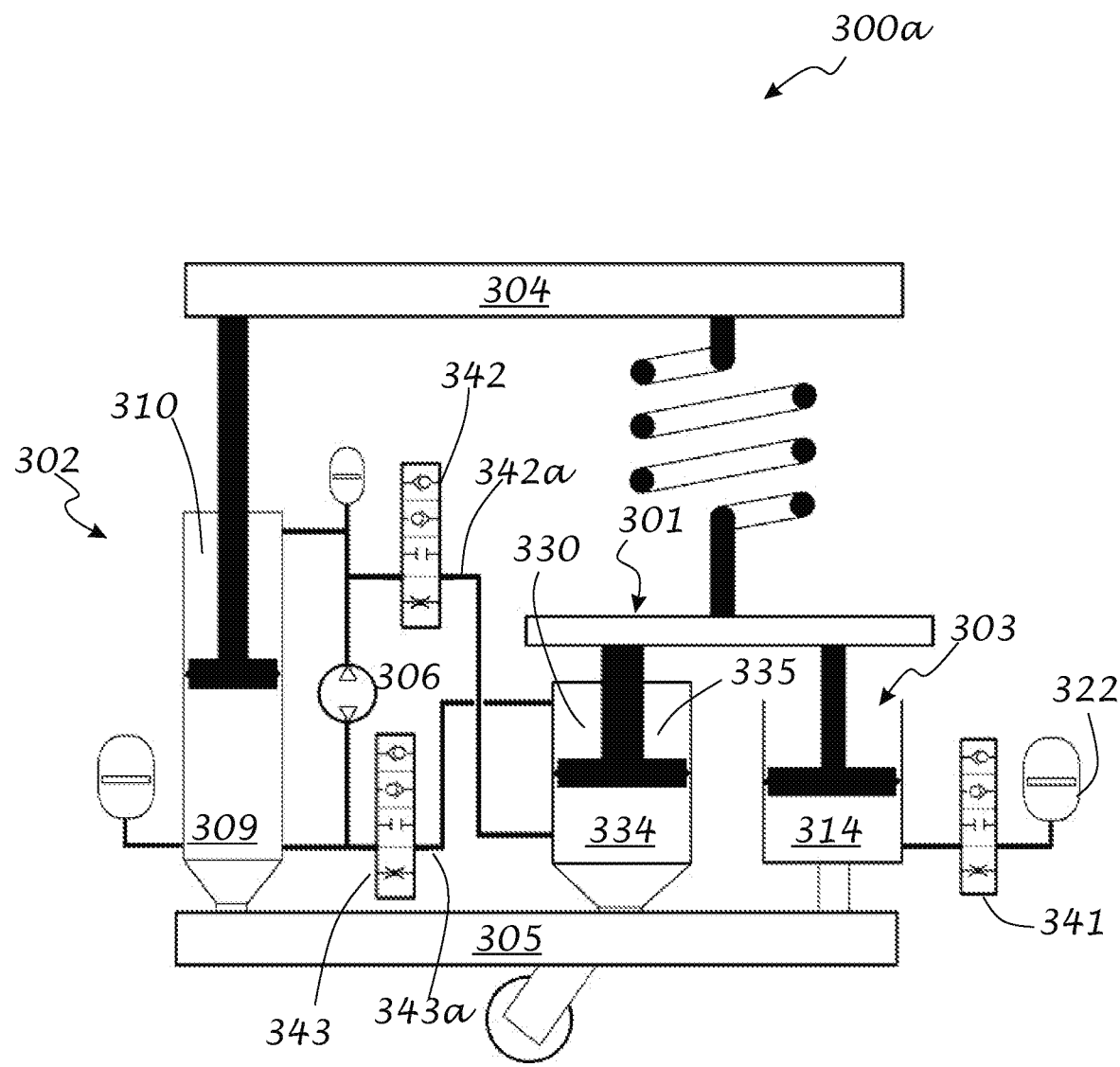
FIG. 15 illustrates a motion control unit as in FIG. 16 where the supply to the roll assist actuator is inverted.

The embodiment illustrated in FIG. 15, is similar to the embodiment described above in regards to FIG. 14 and the same reference numbers are used to indicate corresponding elements. In this embodiment, flow control device 342 and flow path 342a, which connect a port of pump 306 to the compression volume 334, may be used to mitigate pressure fluctuations above a certain frequency threshold, such as for example 3 Hz, before they reach compression volume 334. Flow control device 343 may be used in a similar manner to mitigate pressure fluctuations above a certain preset frequency threshold produced by pump 306 from reaching the extension volume 330. However, in some embodiments, either flow control device 342 or 343 may be eliminated. It should be noted that, in this embodiment, the fluid communication between the extension and compression volumes of actuators 301 and 302 are inverted relative to the embodiment in FIG. 14.

FIG. 16 illustrates one embodiment of an integrated motion control unit 400 which includes an active suspension actuator 402, an auxiliary actuator 421, and a height adjustment actuator 422. These three actuators may work cooperatively to control the relative motion between the vehicle body 404 and wheel assembly 405, as well as the ride-height of the vehicle.

In the embodiment depicted in FIG. 16, accumulator 424 may be in fluid communication with, and control a pressure in, the compression volume 414 of the height adjustment actuator 422. The accumulator 424 may include four chambers: (1) hydraulic fluid filled chamber 424a, that is in selective fluid communication with hydraulic motor-pump 411 and extension volume 410 of the active suspension actuator through flow control device 425, (2) hydraulic fluid filled chamber 424b that is in selective fluid communication with compression volume 414 of the height adjustment actuator through flow control device 426, (3) gas filled chamber 424c and (4) gas filled chamber 424d.

In the embodiment of FIG. 16, accumulator 424 is substantially cylindrical in shape with cylindrical segment 424e and end-caps 424f and 424g. Internal cylinder 424h is attached at one end to end-cap 424f. The accumulator 424 may also include an annular piston 427a and piston 427b formed in a top-hat configuration. The top-hat piston 427b comprises an axially protruding portion 427c that has a smaller diameter than a second portion 427d that extends radially outward from an end of the axially protruding portion. The axially protruding portion is slidably received in the open end of internal cylinder 424h. The chambers 424a, 424b, 424c and 424d may be mutually sealed to prevent exchange of gas and/or fluid between the chambers using any convenient device or method including, for example o-rings 427e.

In the embodiment of FIG. 16, fluid pressure in chamber 424a may be controlled by operating motor-pump 411 and positioning a flow control device 425 to allow flow into or out of the chamber 424a. During operation, the pressure in chamber 424b may be increased by reducing the volume of fluid in chamber 424a. Flow of fluid out of chamber 424a would cause piston 427b to move further into internal cylinder 424h thus increasing the pressure in chamber 424c. By positioning valve 426 to allow flow between volume 424b and volume 414, the pressure in compression volume 414 may be increased. By reversing the motors operation, and increasing the volume of fluid in chamber 424a, the pressure in compression volume 414 may be decreased. In the embodiment in FIG. 16, the force on piston 427b due to the pressure in gas filled chamber 424d may be designed to be greater that the net force on piston 427b due to the gas pressure in chamber 424c.

In the embodiment shown in FIG. 16, the chamber 424a of the accumulator is in selective fluid communication with extension volumes of actuators 402 and 421 through flow control device 425. Thus, the accumulator 424 may be used to control the pressure in the compression volume 414 of the corresponding height adjustment actuator 422.

Figure 17:
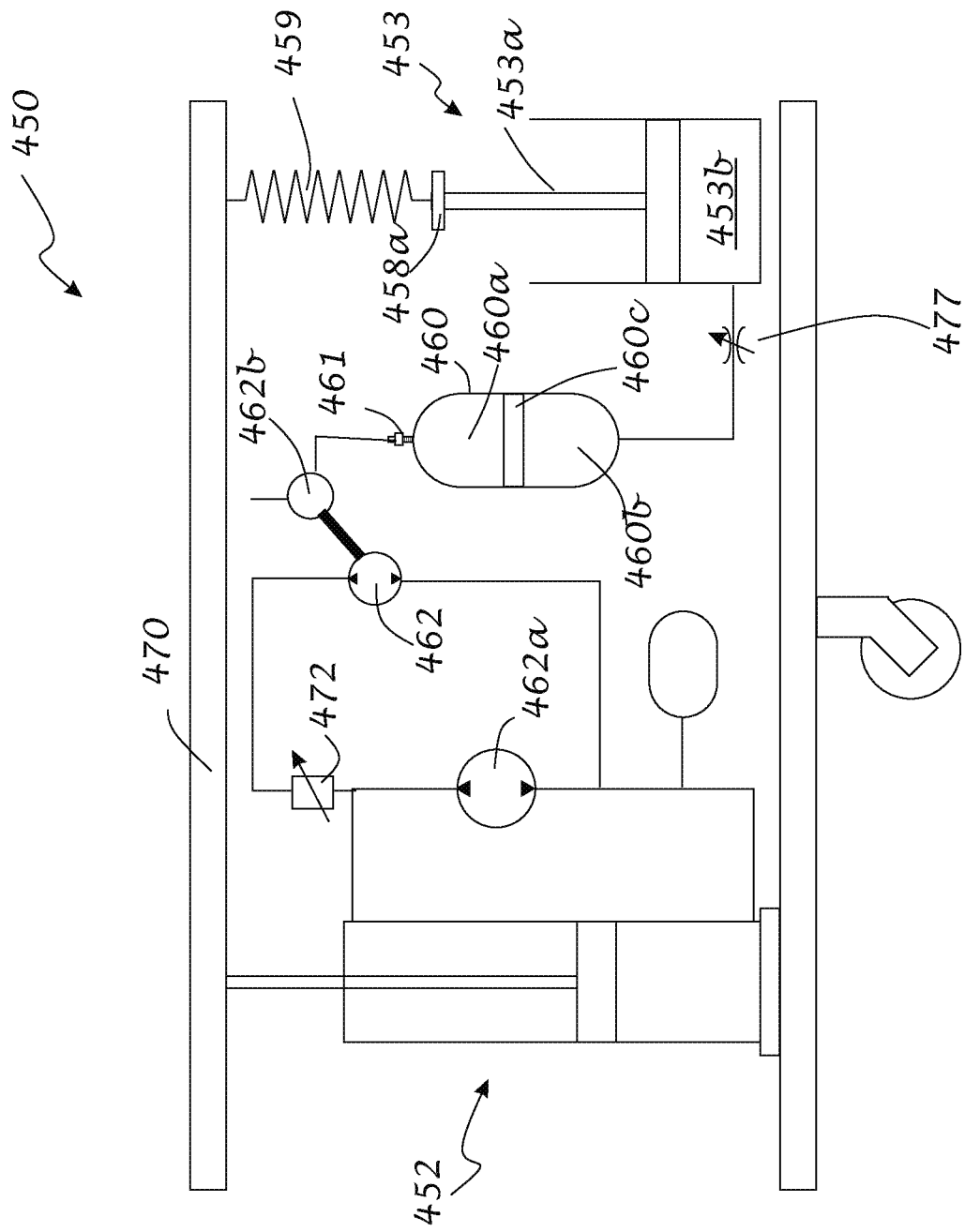
FIG. 17 illustrates a motion control unit with an active suspension actuator, a ride height adjustment actuator, and an accumulator that is pressurized by using an air compressor.

FIG. 17 illustrates an embodiment of an integrated suspension unit 450 with an active suspension actuator 452 and height adjustment actuator 453. Piston rod 453a is attached to spring perch 458a, which supports spring 459. In this embodiment, compression volume 453b may be pressurized by accumulator 460. Accumulator 460 may be partially filled with air 460a which is separated from hydraulic fluid 460b by means of, for example, piston 460c. Valve 461 may be used to add pressurized air to the accumulator.

In this embodiment, a hydraulic motor 462 may operate as a power-takeoff unit to drive an air compressor 462b. The air compressor 462b may be used to increase the pressure in the accumulator to drive more fluid into actuator 453 in order to raise a vehicle 470 associated with the actuators. Conversely, the vehicle may be lowered by allowing air to leave accumulator 460, thus allowing fluid to flow out of compression volume 453b. In some embodiments, flow control device 477 may be used to control exchange of fluid into and/or out of the compression volume 453b. Flow control device 477 may be used to control fluid exchange between hydraulic motor-pump 462a and hydraulic motor 462.

Figure 18:
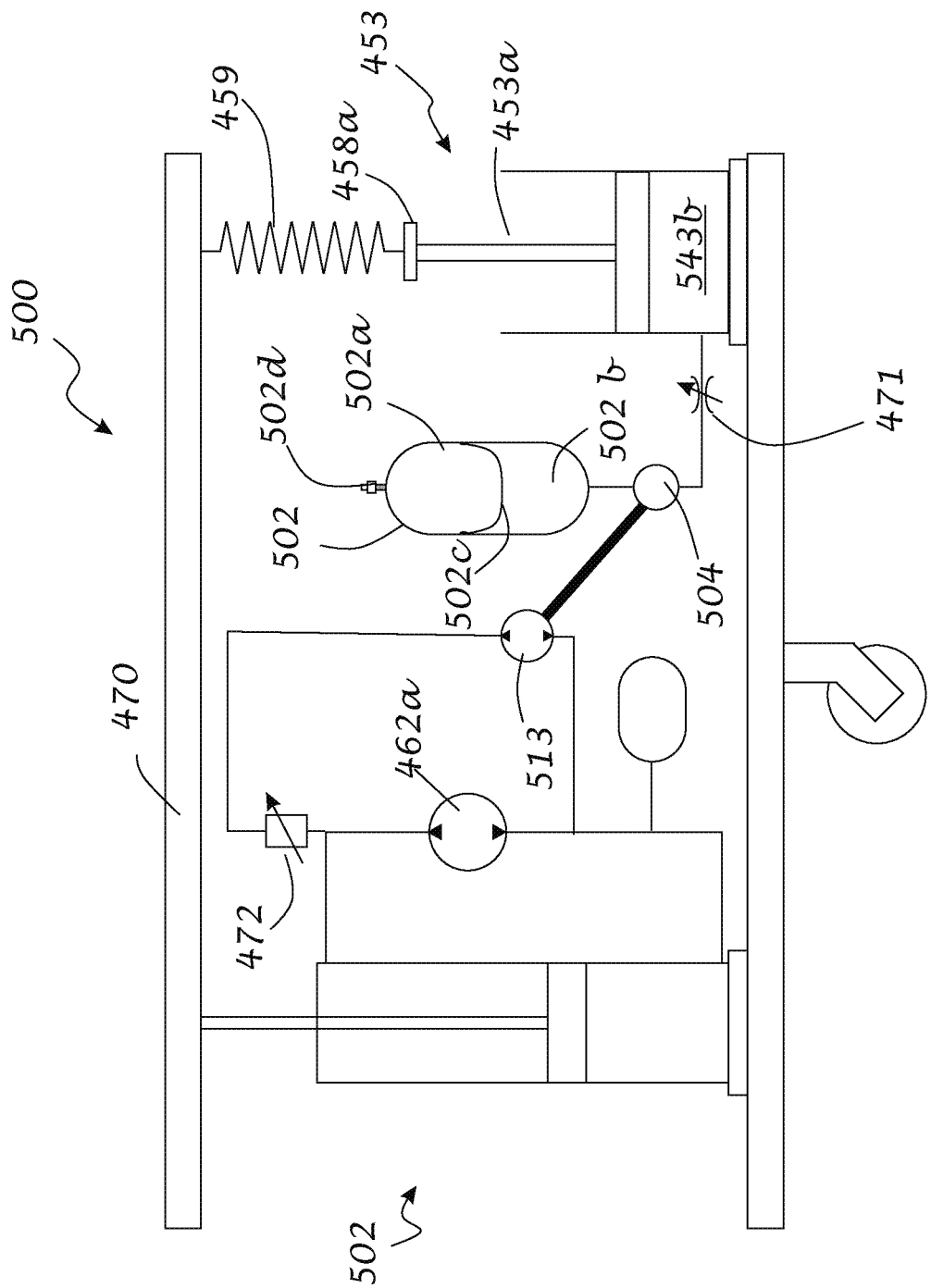
FIG. 18 illustrates a motion control unit with an active suspension actuator, a ride height adjustment actuator, and an accumulator that is pressurized by using a hydraulic power take-off unit and pump combination.

FIG. 18 illustrates another embodiment of an integrated suspension unit 500 with an active suspension actuator 502 and ride height actuator 453. The ride height actuator piston rod 453a is attached to spring perch 458a, which supports spring 459. In this embodiment, compression volume 453b may be pressurized by accumulator 502. Accumulator 502 may be partially filled with gas 502a which is separated from hydraulic fluid 502b by means of, for example, diaphragm 502c. Alternatively, a piston (not shown) may be used instead of the diaphragm to separate the pressurized gas from the hydraulic fluid. Valve 502d may be used to add gas to the accumulator. In the depicted embodiment, a hydraulic motor 513 may operate as a power take-off unit to drive a hydraulic pump 504. Hydraulic pump 504 may be used to control fluid flow between accumulator 502 and compression volume 543b in order to raise or lower the vehicle.

In the above embodiments, the motion control units include actuators shown as distinct hydraulic actuators. In some embodiments, distinct actuators may be used in application such as when the active suspension actuator and the vehicle suspension spring are not co-located. However, in other embodiments, it may be desirable to consolidate two or more actuators into a single apparatus.

Figure 19:
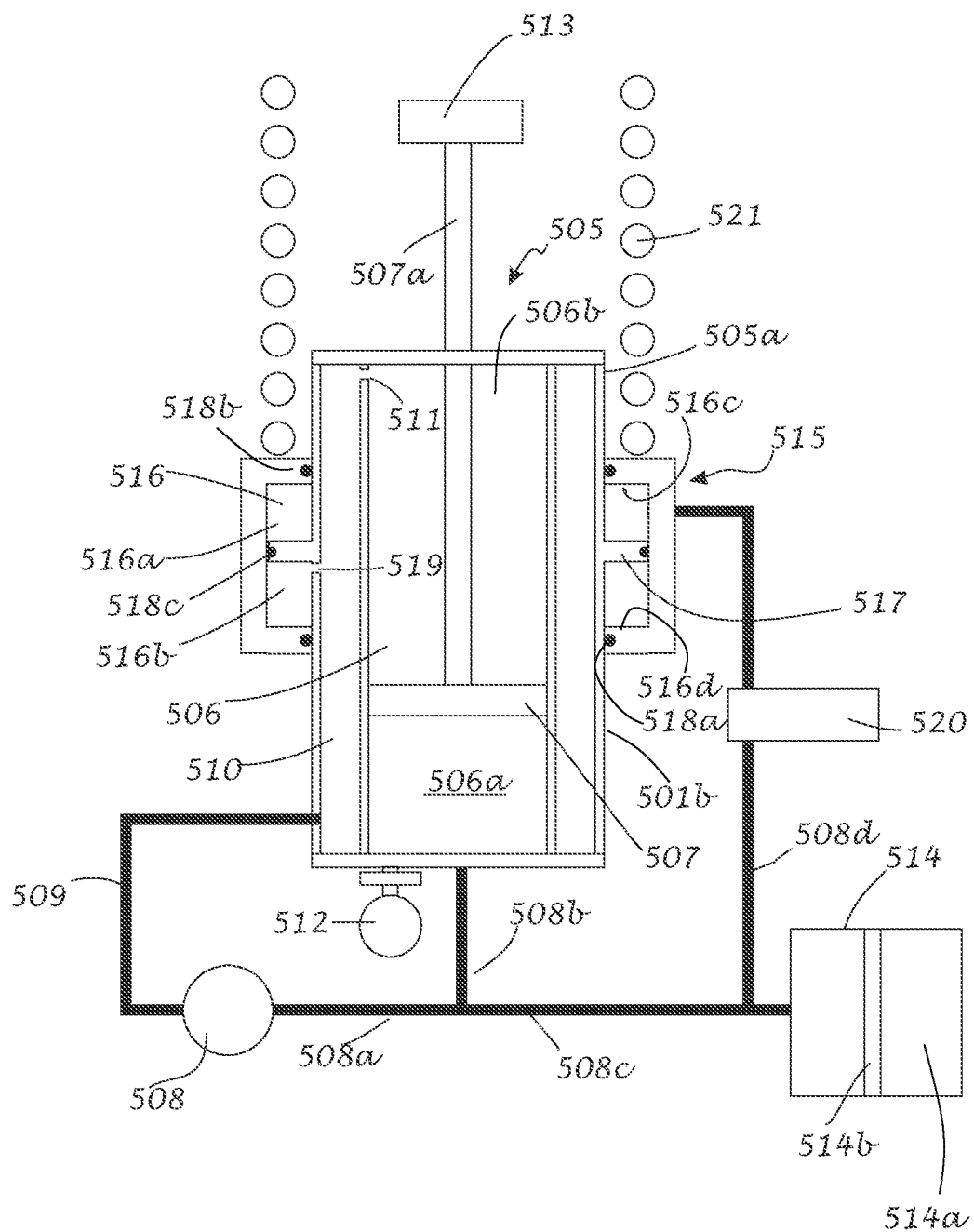
FIG. 19 illustrates an embodiment of an integrated actuator with an active suspension actuator and an annular double-acting spring perch actuator.

FIG. 19 illustrates one possible an embodiment of a consolidated apparatus that includes two actuators. In the depicted embodiment, the primary actuator 505 includes a pressure tube 505a that encloses a volume 506 that is at least partially filled with a hydraulic fluid. At least a portion of the exterior surface 505b of actuator 505 is cylindrical. The volume 506 is divided into a compression volume 506a and an extension volume 506b by piston 507. The piston is slidably received in the pressure tube. The extension volume 506b is on the side of piston 507 that is attached to piston rod 507a that extends out from the pressure tube. Compression volume 506a is on the side of the piston opposite the side that is attached to the piston rod. The primary actuator 505 may be disposed between a wheel assembly 512 and a top mount 513 of a vehicle in order to control the relative motion between the vehicle body and the ground, though the actuator may be used to control the relative movement of other structures as well.

In the embodiment illustrated in FIG. 19, hydraulic motor-pump 508 is in fluid communication with the compression volume 506a of the primary actuator through conduits 508a and 508b and is in fluid communication with extension volume 506b by through conduit 509, conduit 510, and opening 511 formed in an internal tube wall of the primary actuator. The hydraulic motor-pump 508 controls the force applied by the actuator between the vehicle body and the ground by pumping fluid between the compression volume and the extension volume. The pressures in the two volumes may be directly controlled by appropriately controlling the operation of the motor pump. As described above, a motor-pump is a hydraulic device that may be used as both a pump and/or hydraulic motor. In some embodiments, an accumulator 514, or other appropriate structure such as a compressible medium or bladder capable of accommodating fluctuations in fluid volume, is in fluid communication with at least one of the extension and compression volumes. In the depicted embodiment, the accumulator, or other appropriate structure, is sized to at least accommodate the fluid volume displaced by introduction of the piston rod into the pressure tube by supplying fluid to or receiving fluid in volume 506.

Accumulator 514 may include a compressible medium 514a, such as for example nitrogen gas or air, that may be separated from the hydraulic fluid by a piston 514b or other separation device. The hydraulic motor-pump 507 is operatively coupled to an electric motor (not shown), which may be operated as a motor or a generator, i.e. the electric motor may be operated to drive the associated hydraulic motor-pump or the hydraulic motor-pump may drive the electric motor depending on the mode of operation. For example, a primary actuator 501 may be controlled by a controller (not shown) to operate in any one or more of its four force velocity quadrants.

In the embodiment of FIG. 19, an integrated auxiliary actuator piston 515 may be annular in shape with a central opening that is slidably received over at least a portion of the cylindrical exterior surface 501b of the primary actuator housing. Thus, the auxiliary actuator piston may extend radially around and along at least a portion of the axial length of the primary actuator's housing. In other embodiments the auxiliary actuator piston may be of any other convenient shape that may or may not be annular. An additional volume of fluid may be contained in the volume 516 located between the inner surface of annular auxiliary actuator piston 515 and cylindrical surface 501b of the primary actuator. This volume may be separated into two auxiliary volumes 516a and 516b located on either side of a protrusion 517 extending radially outward from the primary actuator. This protrusion may either be attached to, or integrally formed with, the cylindrical surface 501b of the primary actuator.

The interface between the auxiliary actuator piston 515 and the external surface 501b of the primary actuator may be sealed by seals 518a and 518b. These seals may correspond to any appropriate sliding sealed interface including, for example, O-ring seals. Correspondingly, the protrusion 517 of the primary actuator may be sealed against an interior surface of the auxiliary actuator piston by a seal 518c disposed there between. For example, an O-ring seal may be located between the inner surface of auxiliary actuator piston 515 and an outermost surface of the protrusion. With seals 518a, 518b, and 518c in place the auxiliary volumes 516a and 516b may be pressurized to different pressures. Volume 516a may be in selective fluid communication with an accumulator 514 and compression volume 506a of the primary actuator through conduits 508b, 508c, and 508d, while volume 516b is in fluid communication with the extension volume of the primary actuator through an internal volume 510 of the primary actuator, such as the outer tubular space in a double tube arrangement, through openings 511 and 519 formed in the inner and outer tubular walls of the primary actuator. Valves, such as for example diverter valves, may be used to control the flow in one or more of the conduits of the depicted apparatus. For example, a valve 520 may be an on/off solenoid valve, variable valve, or any other valve that may be used to isolate volume segment 516a from the rest of the hydraulic circuit including, for example, the accumulator, the hydraulic motor-pump, and compression volume 503. The interactions of these various components to control actuation of the auxiliary actuator is further described below.

In some applications, an auxiliary actuator piston 515 may be used as a spring perch for a spring 521, which may be a helical spring or any other convenient spring that is interposed between the wheel assembly 512 and a vehicle body (not shown). Alternatively or additionally, the auxiliary actuator piston 515 may be attached to a point on a roll-bar or stabilizer bar (not shown). The auxiliary actuator piston 515 may be used, individually or in concert with one or more other auxiliary actuator pistons and/or one or more other primary actuators, to adjust vehicle ride height, ground clearance, or degree of vehicle roll.

During operation of the embodiment of an integrated actuator depicted in FIG. 19, a primary actuator 505 may be a fully active actuator, a semi-active damper, and/or a passive damper. Additionally, the depicted accumulator 514 may be charged to any appropriate pressure. Under these circumstances, if the hydraulic motor-pump is not operating and the system reaches equilibrium, the pressures in the compression volume 503 and extension volume 504 will eventually equal the charge pressure of the accumulator. Therefore, at equilibrium the net force on piston 505 will be equal to the pressure in the compression volume multiplied by the cross-sectional area of the piston rod 506. Therefore, if, for example, the charge pressure of the accumulator is 30 bar, the primary actuator system is in equilibrium, and the diameter of the piston rod is 15 mm, a force of approximately 530 N force will be applied to the top mount along the axis of the piston rod.

When it is desired to prevent actuation of the auxiliary piston, flow control device 520 is may be configured to seal auxiliary volume 516a. When flow control device 520 is so configured, the motion of the auxiliary actuator piston 515 is constrained due to the fluid trapped in auxiliary volume 516a being effectively incompressible while the leakage through seals 518a, 518b, and 518c is minimal. However, it is noted that at least some small amount of movement may occur due to all systems typically have some amount of compliance and/or leakage.

Figure 21:
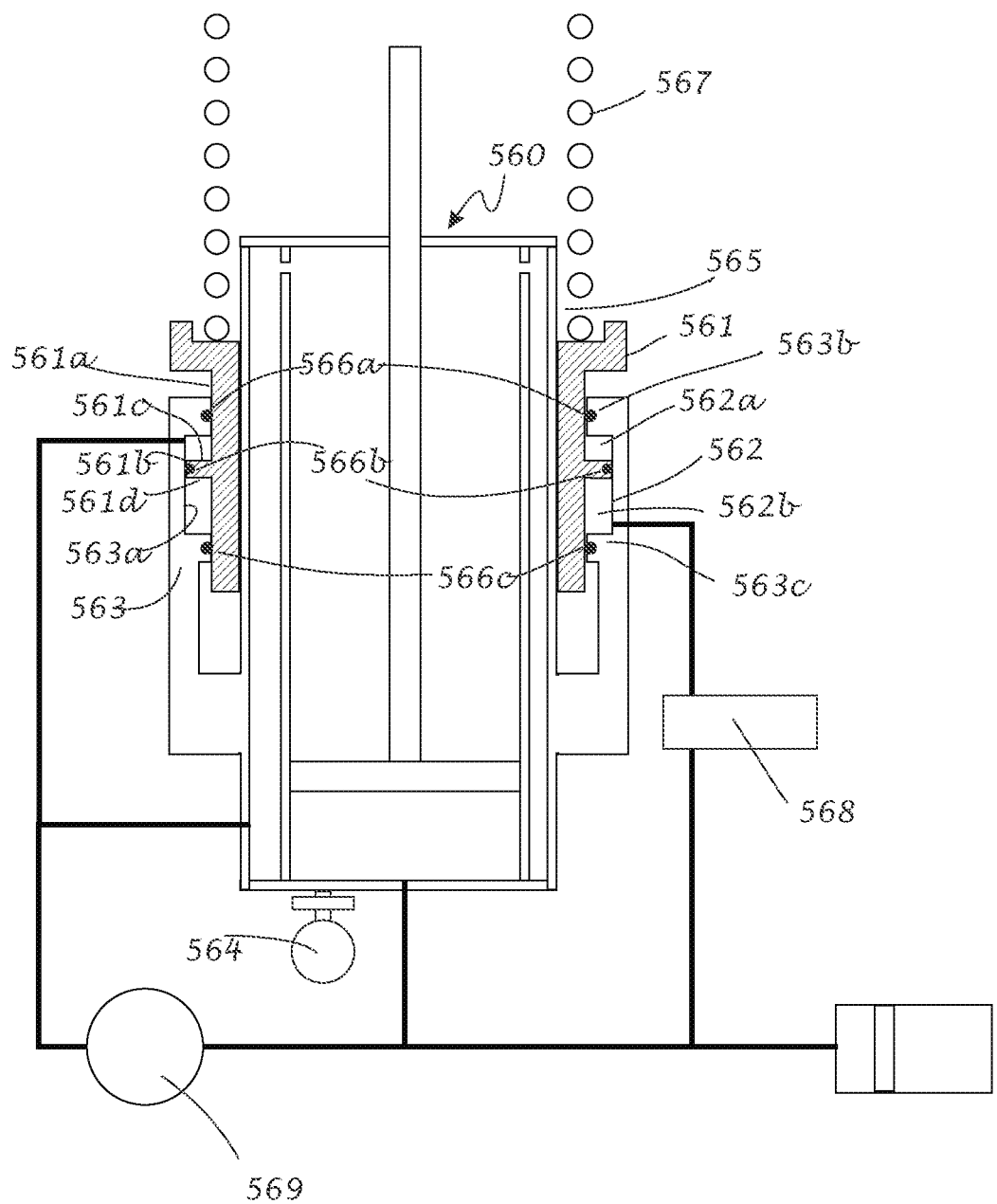
FIG. 21 illustrates another embodiment of an integrated actuator with an active suspension actuator and an annular double-acting spring perch actuator.

When it is desired to actuate the auxiliary piston, the flow control device 520 may be at least partially opened. Once this occurs, the hydraulic motor-pump 507 may be used to apply a net force to the auxiliary actuator piston by establishing a differential pressure between the auxiliary volumes 516a and 516b located on opposing sides of the protrusion extending outwards from the primary actuator housing may correspond to auxiliary extension and compression volumes respectively. In the embodiment shown in FIG. 21, the pressure in 516a may be reduced or increased relative to the pressure in 516b by operating the hydraulic motor-pump 507 to reduce or increase the pressure in the auxiliary extension volume relative to the pressure in the auxiliary compression volume respectively. In the embodiment of FIG. 21, the net force in the axial direction applied on the auxiliary actuator piston 515 due to internal pressure is the pressure in the auxiliary extension volume multiplied by an area of surface 516c of the auxiliary piston within the auxiliary extension volume minus the pressure in the auxiliary compression volume multiplied by an area of surface 516d of the auxiliary piston within the auxiliary compression volume.

The shape of the of the auxiliary actuator piston 515 may be any convenient shape, whether annular or not, that may effectively engage the primary actuator and one or more spring elements of the suspension system of a vehicle. The areas 516c and 516d noted above correspond to the areas that are effectively acted upon by the pressure of the hydraulic fluid in volume elements 516a and 516b, respectively, during actuation of the auxiliary actuator. The areas 516c and 516d may be of equal size or they may be different in size relative to each other as the disclosure is not so limited. The relative size of these elements will determine the relative pressures need in auxiliary volumes 516a and 516b in order to exert a desired force in a desired direction on a particular spring element. Accordingly, vehicle height may be adjusted by applying the resulting net force to the bottom of spring 521. Alternatively or additionally, the auxiliary actuator piston may be used to apply a force between the wheel assembly and the vehicle body to augment a force applied by the primary actuator. Alternatively or additionally, the auxiliary actuator piston may be used to apply a force to a roll-bar of a vehicle in a manner that alters the torque in the roll-bar.

In some embodiments, the auxiliary actuator piston 515 may be raised, relative to wheel assembly 512, through the use of a flow control device 520. In the depicted embodiment, flow control device 520 is positioned and configured to selectively establish fluid communication between pump 507 and auxiliary volume 516a. When fluid communication is established, the pump may pump fluid into auxiliary volume 516a, corresponding to an extension volume, to raise the actuator. Alternatively, auxiliary actuator piston 515 may be lowered, relative to wheel assembly 512, by reducing the pressure in auxiliary volume 516a, the auxiliary extension volume, relative to the pressure in auxiliary volume 516b, the auxiliary compression volume. Accordingly, the auxiliary actuator depicted in FIG. 19, is a dual acting piston. Further, when the areas 516c and 516d are equivalent, then the actuator piston may function equivalently to a dual acting piston with a through rod. Additionally, in some embodiments, the flow control device 520, in conjunction with the flow passages it is associated with, may also function as a low pass filter between the auxiliary volume 516a and the pump 507. Accordingly, in this manner, the frequency response of the auxiliary actuator 515 may be different than the frequency response of the primary actuator 501 in a similar fashion to the integrated actuator systems described above.

Figure 20:
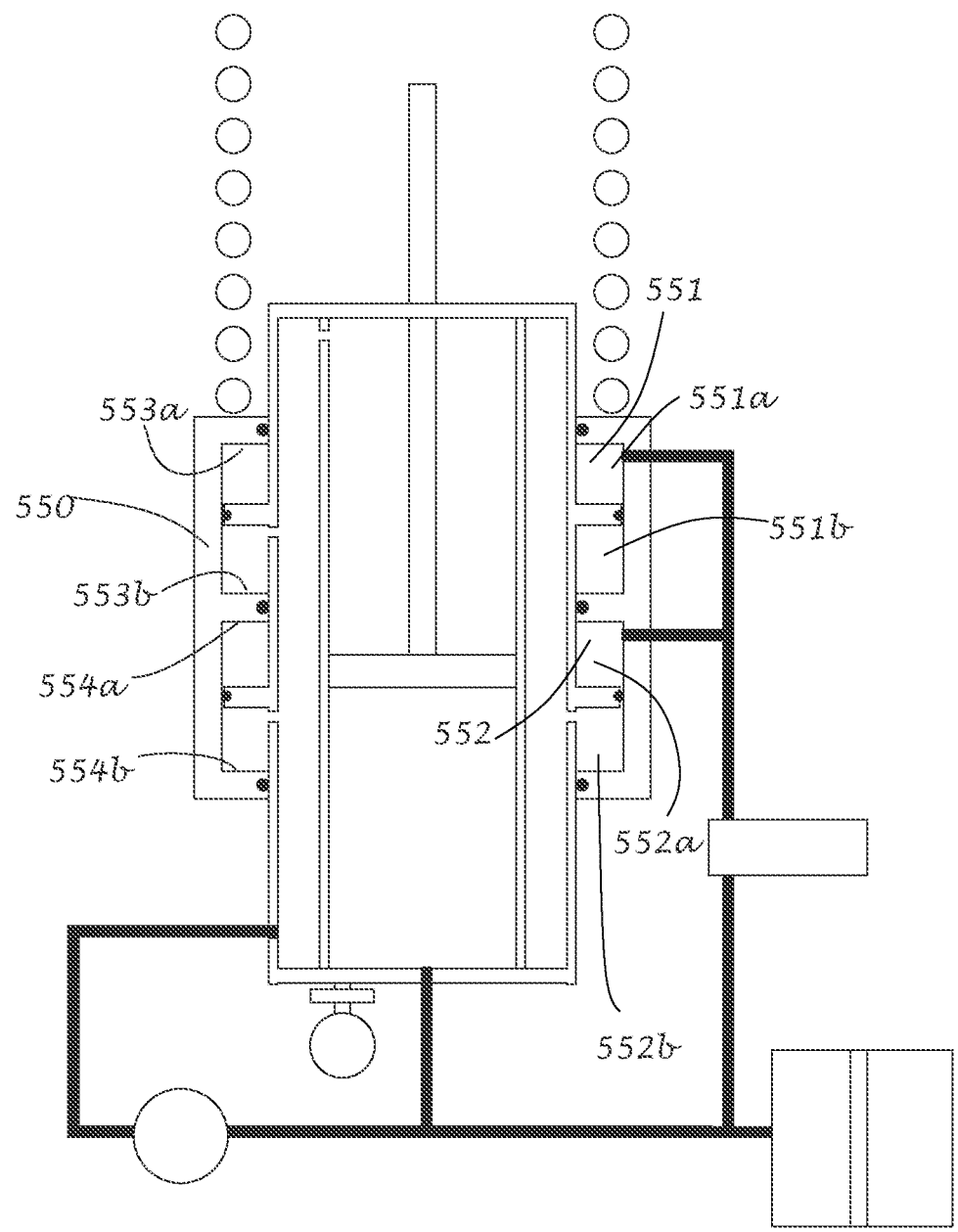
FIG. 20 illustrates an integrated actuator with an active suspension actuator and an annular, tandem double-acting spring perch actuator.

In some embodiments, it may be desirable to increase the force of an auxiliary actuator piston without increasing the overall cross sectional area of the device. Accordingly, FIG. 20 illustrates an embodiment with an auxiliary actuator piston 550 that includes at least two auxiliary volumes 551 and 552 formed by multiple protrusions extending out from the primary actuator housing and similar protrusions extending inwards from the auxiliary actuator housing to form multiple auxiliary compression and extension volumes 551 and 552 which may operate in a manner similar to that described above. Specifically, in the depicted embodiment, auxiliary volume portions 551a and 552a, corresponding to extension volumes, are in fluid communication with each other and auxiliary volume portions 551b and 552b, corresponding to compression volumes, are in fluid communication with each other. Accordingly, surface areas associated with these auxiliary volumes may increase the effective surface area the pressures are applied to without increasing the overall cross section of the auxiliary actuator piston. For example, in the depicted embodiment, the net force applied to the auxiliary actuator piston 550 is equal to the pressure of the fluid in auxiliary volume 551a multiplied by the area 553a plus pressure of the fluid in auxiliary volume 552a multiplied by the area 554a minus pressure of the fluid in auxiliary volume 551b multiplied by the area 553b minus pressure of the fluid in auxiliary volume 552b multiplied by the area 554b. In other words, the combined areas of the multiple extension auxiliary volumes multiplied by the corresponding pressures in those extension volumes minus the areas of the multiple auxiliary compression volumes multiplied by the corresponding pressures in those compression volumes provides the resulting force applied to the auxiliary actuator piston. By using one, or a plurality of, protrusions extending inwards from an inner surface of the auxiliary actuator piston, may form a two or more corresponding pairs of extension and compression auxiliary volumes, along with and the corresponding areas, along a length of a primary actuator. These areas associated with the plurality of auxiliary volumes may increase the effective area on which the net pressure is applied to the auxiliary actuator piston without increasing the outside diameter of the auxiliary actuator piston.

FIG. 21 illustrates another embodiment with a primary actuator 560 and auxiliary actuator piston 561. Auxiliary actuator piston 561 has an inner cylindrical opening that slidably receives at least a portion of cylindrical surface 565 of the primary actuator. An auxiliary volume 562 may be formed by the outer surface 561b of actuator 561 which is sealed against the inner surface 563a of axially extending cylinder 563 and the annular protrusions 563b and 563c that extend radially inwardly from surface 563a of the cylinder 563 towards the outer surface 561a of actuator 561. Cylinder 563 may be attached to the primary actuator 560 or otherwise fixed relative to the wheel assembly 564. Volume 562 is divided into auxiliary volume portions 562a and 562b by radially outwardly extending protrusion 561b to form the extension and compression volumes respectively. These auxiliary volume portions may be sealed relative to each other and the exterior environment by seals 566a, 566b and 566c, which may be for example O-ring seals. Auxiliary volume portion 562a may be in fluid communication with a first port of a hydraulic motor pump 569 and the auxiliary volume portion 562b may be in fluid communication with a second portion of the pump. In some embodiments, the fluid communication between the second port of the pump and auxiliary volume portion 562 is through a valve 568 or other flow control device.

In the embodiment in FIG. 21, the net force applied to actuator 561 due to the pressure of the hydraulic fluid in auxiliary volume portions 562a and 562b is equal to the pressure of the hydraulic fluid in these volumes multiplied by the areas 561c and 561d of these volumes respectively. The pressures in auxiliary volume portions 562a and 562b may be controlled during operation in a similar fashion to controlling the pressures in the auxiliary volumes described in the embodiment of FIG. 19.

Figure 23:
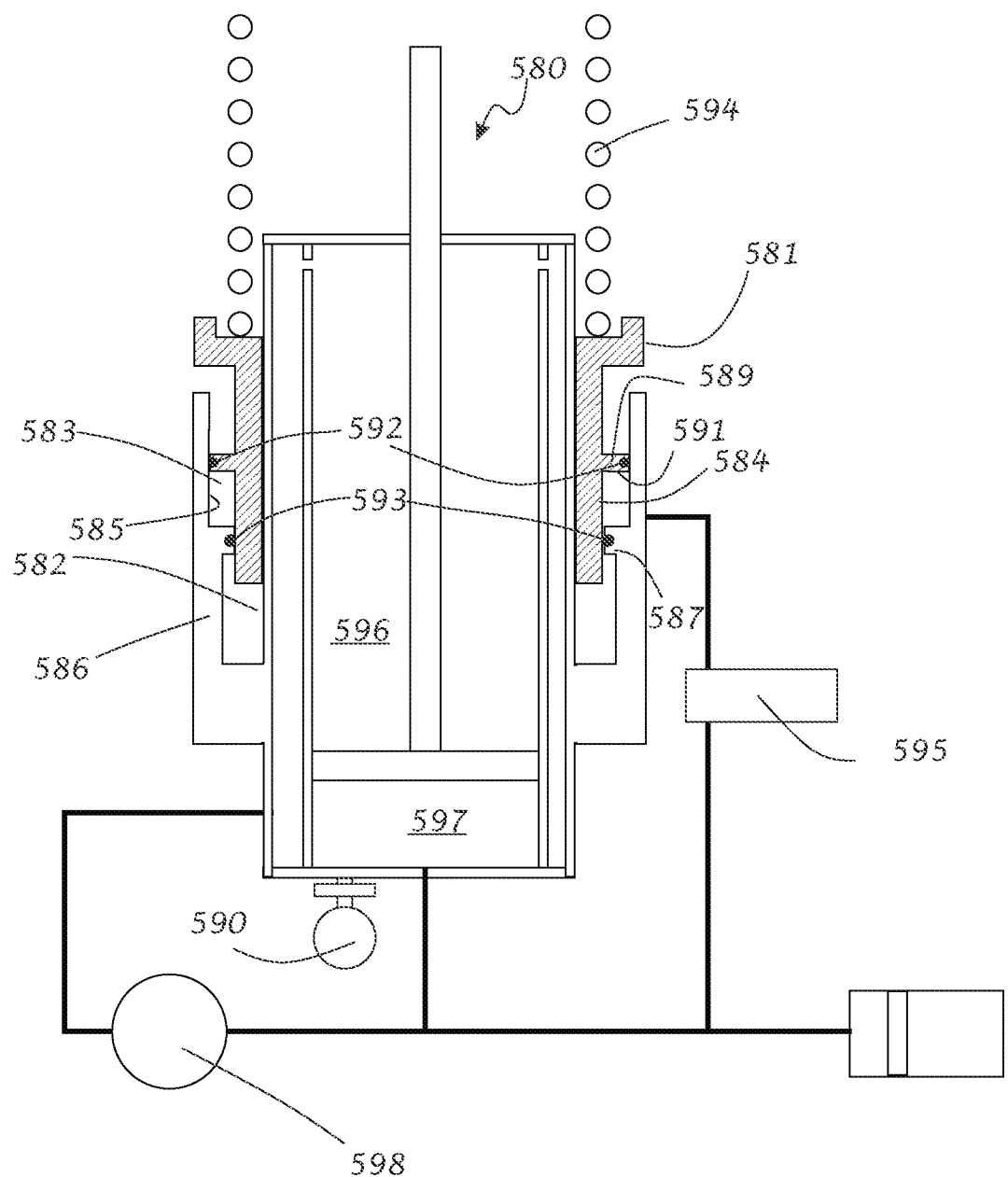
FIG. 23 illustrates another embodiment of an integrated actuator with an active suspension actuator and an annular single-acting spring perch actuator.

By using the embodiment of FIG. 23, vehicle height may be adjusted by applying the resulting net force to the bottom of spring 567. Alternatively or additionally, the auxiliary actuator may be used to apply a force between the wheel assembly and the vehicle body to augment the force applied by the primary actuator. Alternatively or additionally, the auxiliary actuator piston may be used to apply a force to a roll-bar of a vehicle in a manner that alters the torque in the roll-bar.

In some embodiments the auxiliary actuator piston 561 may be raised, relative to a wheel assembly 564, by at least partially opening a valve controlled by fluid control device 568 and pumping fluid into auxiliary volume portion 562b. Alternatively, in some embodiments, the auxiliary actuator piston 561 may be lowered, relative to the wheel assembly 564, by at least partially opening valve 568 and increasing the pressure in volume 562a to a pressure sufficiently higher than the pressure in volume element 562b by using hydraulic motor pump 569.

Again, a shape of the of the auxiliary actuator piston 561 may be any convenient shape, whether annular or not, that may effectively engage the primary actuator 560 and one or more spring elements of the suspension system of a vehicle. The areas 561c and 561d associated with the auxiliary volume portions represent the areas that are effectively acted upon by the pressure of the hydraulic fluid in the auxiliary volume portions 562a and 562b, respectively. The areas 561c and 561d may be of equal size or they may be different as the disclosure is not so limited. Additionally, the relative size of these elements may be used to determine the relative pressures needed in auxiliary volume portions 562a and 562b in order to exert a desired force in a desired direction on a particular spring element.

Figure 22:
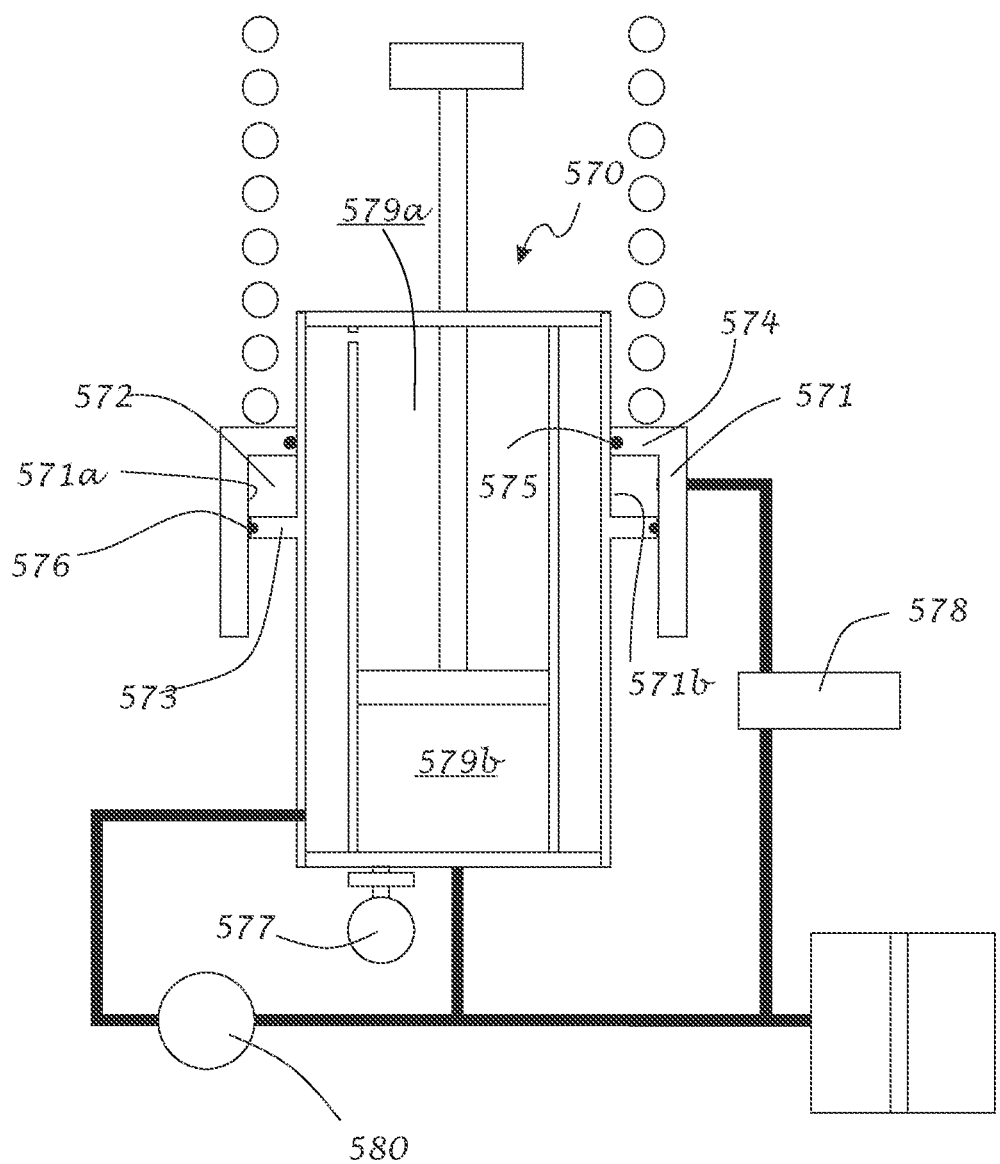
FIG. 22 illustrates an embodiment of an integrated actuator with an active suspension actuator and an annular single-acting spring perch actuator.

FIG. 22 illustrates another embodiment with a primary actuator 570 and auxiliary actuator piston 571. The integrated auxiliary actuator piston 571 may be annular in shape with a central opening that slidably receives at least a portion of a cylindrical exterior surface 571b of the primary actuator. Auxiliary volume 572 is formed by the inner surface 571a of the annular auxiliary actuator piston 571, the cylindrical exterior surface 571b of the primary actuator, and a protrusion 573 extending radially outward from the exterior surface of the primary actuator. The protrusion may either be attached to, or integrally formed with, the cylindrical surface 571b. Similar to the above embodiments, an interface between the auxiliary actuator piston 574 and surface 571b may be sealed by seal 575, which may be for example an O-ring seal. A radially outermost edge of protrusion 573 may similarly be sealed by seal 576, which may be for example an O-ring seal, against the inner surface of auxiliary actuator piston 571.

In some embodiments, a hydraulic motor-pump 580 is in fluid communication with an extension volume 579a and compression volume 579b of the primary actuator. The hydraulic motor pump and/or an accumulator 581 may also be in fluid communication with the auxiliary volume 572 through a flow control device 578. Thus, the auxiliary actuator piston 574 may be raised, relative to wheel assembly 577, by configuring the fluid control device 578 to provide fluid communication between the hydraulic motor pump and/or the accumulator. This may result in fluid being pumped into the auxiliary volume 572. Alternatively, in some embodiments, auxiliary actuator piston integrated motion control unit 574 may be lowered, relative to wheel assembly 577, by positioning fluid control device 578 to provide fluid communication between volume 572 and the hydraulic motor pump and/or the accumulator. The pressure in volume 579 may then be reduced sufficiently to lower the auxiliary actuator relative to the wheel assembly 577.

FIG. 23 illustrates another embodiment with a primary actuator 580 and auxiliary actuator piston 581. Auxiliary actuator piston 581 has an inner cylindrical opening that slidably receives at least a portion of cylindrical surface 582 of the primary actuator. The primary actuator also includes an outer cylinder 586 in addition to the primary cylinder housing the primary actuator that is sized and shaped to slidably receive at least a portion of the auxiliary actuator piston. An auxiliary volume 583 is formed by the outer surface 584 of auxiliary actuator piston 581, the inner surface 585 of axially extending cylinder 586, a protrusion 587 that extends radially inwardly from a surface 585 of the outer cylinder 586 of the primary actuator towards the outer surface 588 of the auxiliary actuator piston 581. A corresponding protrusion 589 extends radially outwardly from the outer surface 584 of the auxiliary actuator piston towards an inner surface of the outer cylinder of the primary actuator. Auxiliary volume 583 may be sealed by seals 592 and 593, which may be for example O-ring seals. The outer cylinder 586 may be attached to the primary actuator 580, or otherwise fixed relative, to the wheel assembly 590 in any appropriate fashion.

In the embodiment depicted in FIG. 23, the force applied to the auxiliary actuator piston 581 due to the pressure of the hydraulic fluid in auxiliary volume 583 is equal to the pressure of the hydraulic fluid in the volume multiplied by the corresponding effective area 591. The pressure in the auxiliary volume 583 may be controlled during operation in a fashion similar to that described above in relation to FIG. 22.

By using the embodiment of FIG. 23, vehicle height may be adjusted by applying the resulting net force to the bottom of spring 594. Alternatively, or additionally, the auxiliary actuator may be used to apply a force between the wheel assembly and the vehicle body to augment the force applied by the primary actuator. Alternatively or additionally, the auxiliary actuator piston may be used to apply a force to a roll-bar of a vehicle in a manner that alters the torque in the roll-bar.

In some embodiments the auxiliary actuator piston 581 may be raised, relative to a wheel assembly 590, by configuring flow control device 595 to permit at least some fluid communication to pump fluid into volume 583 using a hydraulic motor-pump 598. Alternatively, in some embodiments, auxiliary actuator piston 581 may be lowered, relative to the wheel assembly 590, by configuring the flow control device 595 to establish fluid communication between pump 598 and volume 583.

Figure 24:
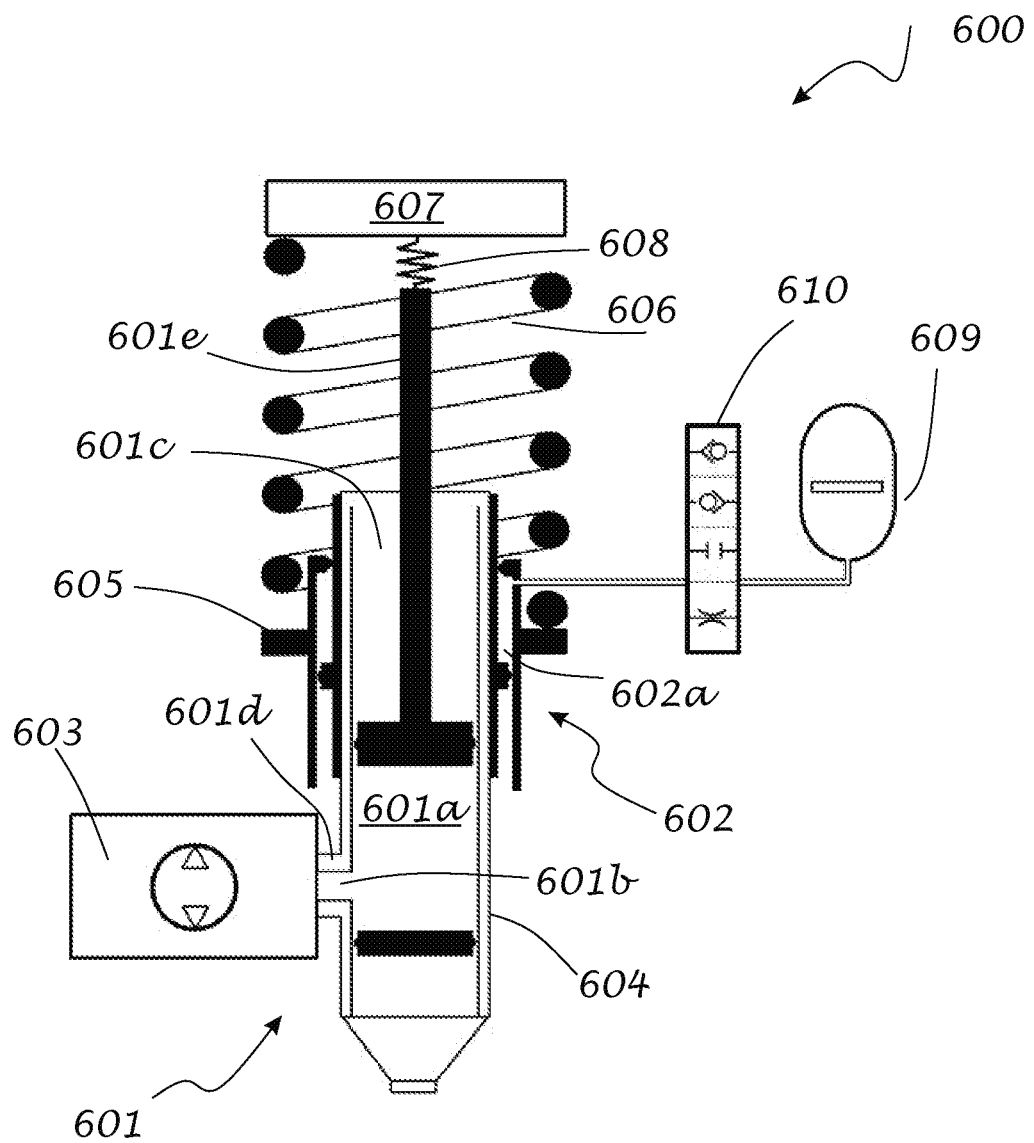
FIG. 24 illustrates still another embodiment of an integrated actuator with an active suspension actuator and an annular single-acting spring perch actuator.

FIG. 24 illustrates an embodiment of an integrated actuator 600 that includes a primary (active suspension) actuator 601 and an auxiliary actuator 602. The primary actuator 601 includes a hydraulic motor-pump 603 that may be attached to a damper housing 604. U.S. Pat. No. 9,035,477, entitled "Integrated energy generating damper," describes an active suspension actuator where the motor-pump is attached to the damper housing. The description of the construction and operation of such an active suspension actuator is incorporated herein by reference in its entirety. The hydraulic motor-pump 603 is in fluid communication with the compression volume 601a by means of port 601b and with extension volume 601c through port 601d.

In the depicted embodiment, the auxiliary actuator 602 includes a hydraulically adjustable spring perch 605 that supports helical suspension spring 606. Spring 606 supports vehicle body 607. The piston rod 601e of the primary actuator is connected to the vehicle body 607 by an intervening top mount 608. The auxiliary actuator 602 also includes an internal volume 602a that is in selective fluid communication with an accumulator 609. The fluid communication between the volume 602a and the accumulator 609 is controlled by a flow control device 610. During operation, the flow control device 610 may be used to pressurize volume 602a such that a force is applied by the auxiliary actuator to the bottom of spring 606. The primary actuator 601 may then be used to raise and/or lower the vehicle by providing any force that may be required by controlling the differential pressure between volumes 601c and 601a.

When the flow control device 610 is positioned to allow fluid exchange between volume 602a and the accumulator, the pressures in these volumes may become equilibrated over time. In some embodiments, by precharging the accumulator to a predetermined set pressure, the actuator may support the associated portion of the vehicle weight that is applied to spring 606. In some embodiments or under certain environmental conditions, the set pressure may be within a range of ±10% of the pressure required to support the applied weight. In some embodiments or under certain environmental conditions, the set pressure may be within a range of ±20% of the required pressure. It should be understood that other precharge pressures both greater and less than the above noted range are also contemplated as the disclosure is not so limited.

Figure 25:
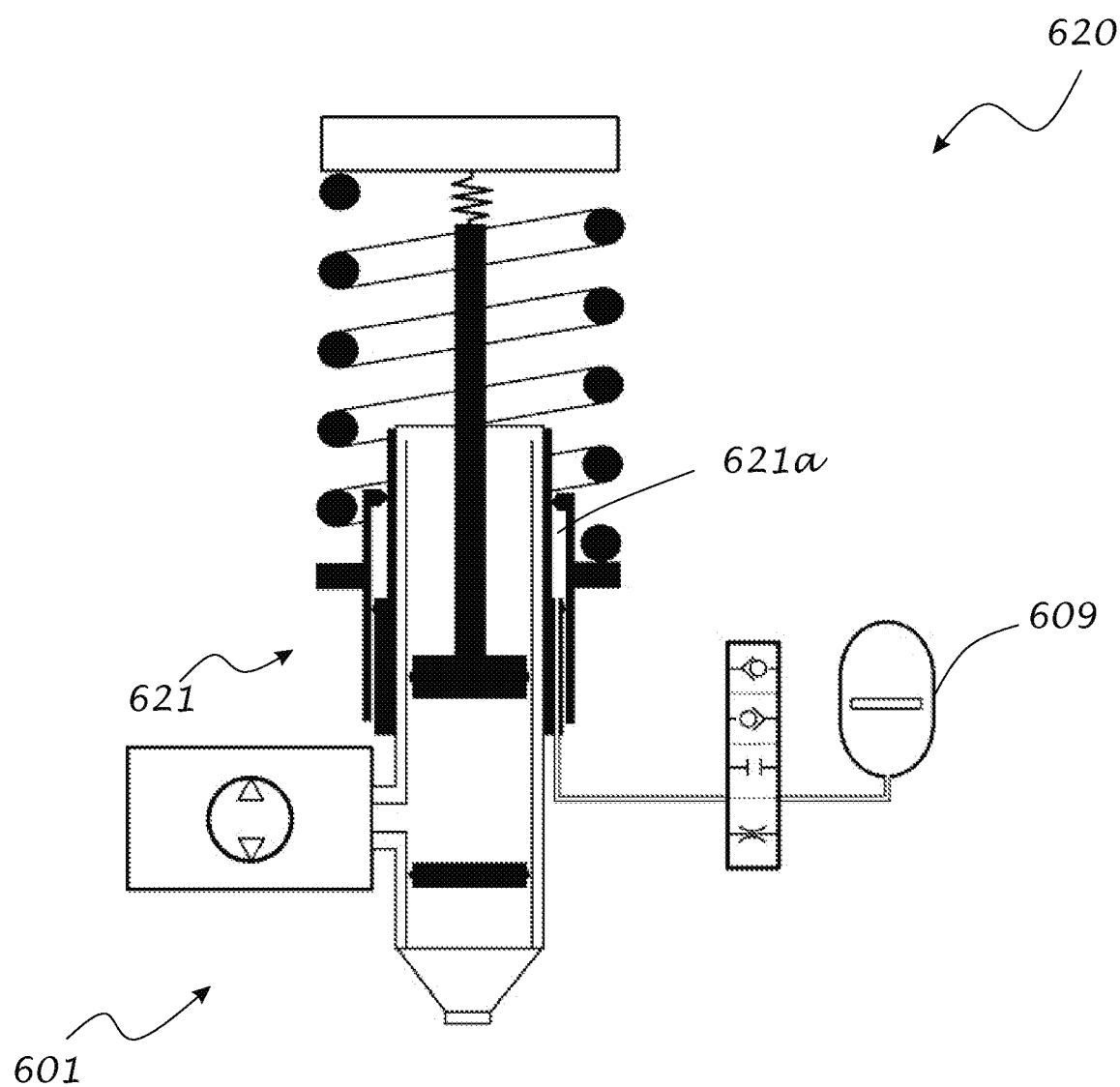
FIG. 25 illustrates yet another embodiment of an integrated actuator with an active suspension actuator and an annular single-acting spring perch actuator.
Figure 26:
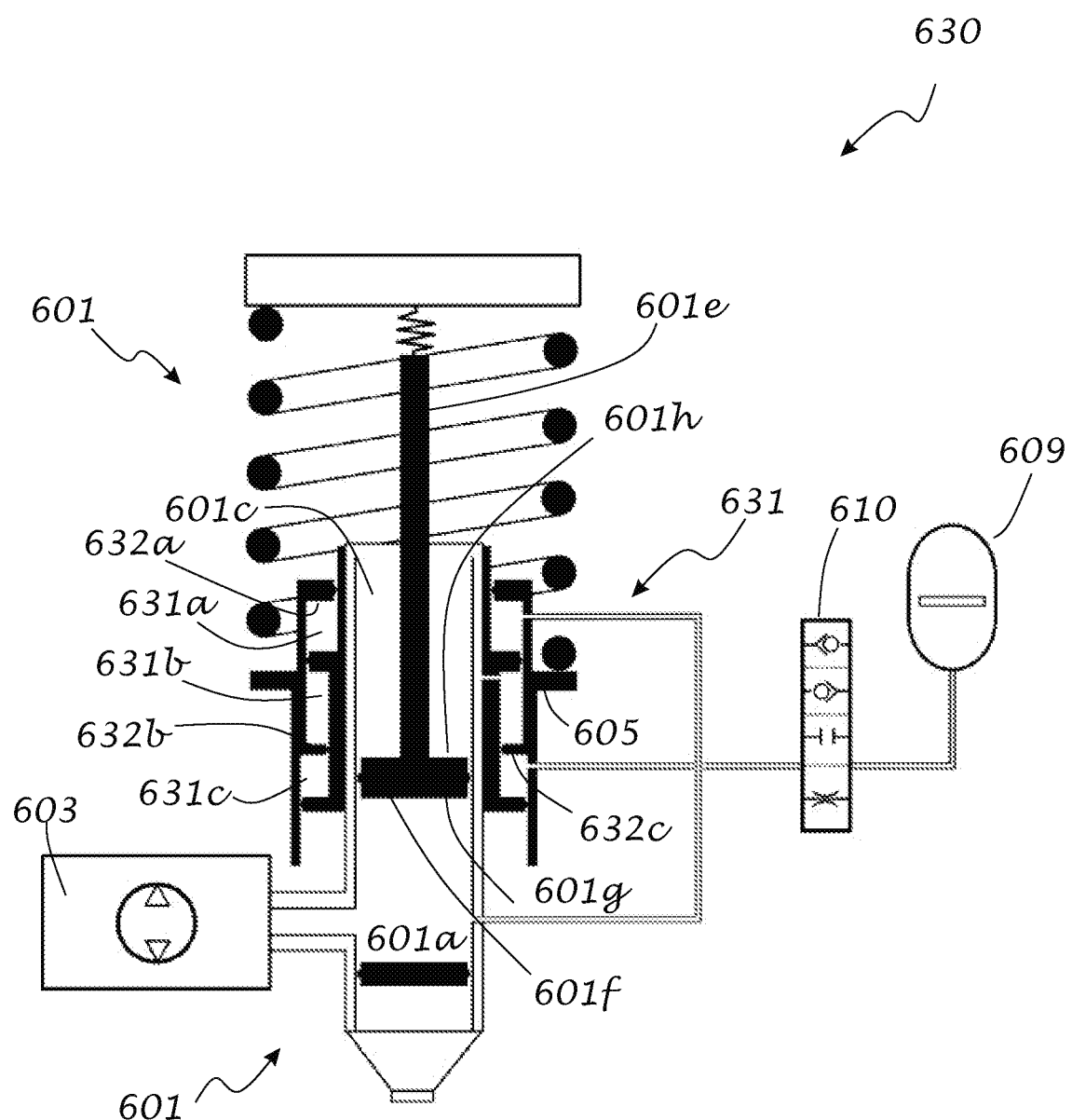
FIG. 26 illustrates an embodiment of an integrated actuator with an active suspension actuator and an annular double-acting spring perch actuator assisted by a pressurized accumulator.

FIG. 25 illustrates an embodiment of an integrated actuator 620 that includes a primary actuator 601 and auxiliary actuator 621. An interior volume 621a of the auxiliary actuator may be in fluid communication with an accumulator 609. However, fluid connection to volume 621a is fixed relative to primary actuator 601 and does not move with actuator 621. FIG. 26 illustrates yet another embodiment of an integrated actuator 630 that includes a primary actuator 601 and an auxiliary actuator 631. The auxiliary actuator 631 includes an internal volume 631a that is in fluid communication with the compression volume 601a of the primary actuator and a separate internal volume 631b that is in fluid communication with the extension volume 601c of the primary actuator.

In this embodiment, the differential pressure produced by an associated hydraulic motor-pump 603 is applied to both actuators. The net force applied by the integrated actuator on the vehicle body is equal because of the forces applied by the piston rod 601e and the adjustable perch 605. The force applied by piston rod 601e is equal to the pressure in the compression volume 601a multiplied by the circular area 601f of piston 601g minus the pressure in extension volume 601c multiplied by the annular area 601h of the piston 601g. The net force applied by the adjustable perch 605 is equal to the pressure in volume 631a multiplied by the area 632a minus the pressure in volume 631b multiplied by area 632b plus the pressure in volume 631c multiplied by area 632c.

The pressure in volume 631c may be determined by the pressure in accumulator 609 that is in fluid communication with volume 631a and accumulator 609 is controlled by flow control device 610. It should be noted that when the motor-pump 603 is not producing pressure, for example when it is turned off, the pressures in volumes 601a, 601c, 631b and 631b will equilibrate.

Figure 27:
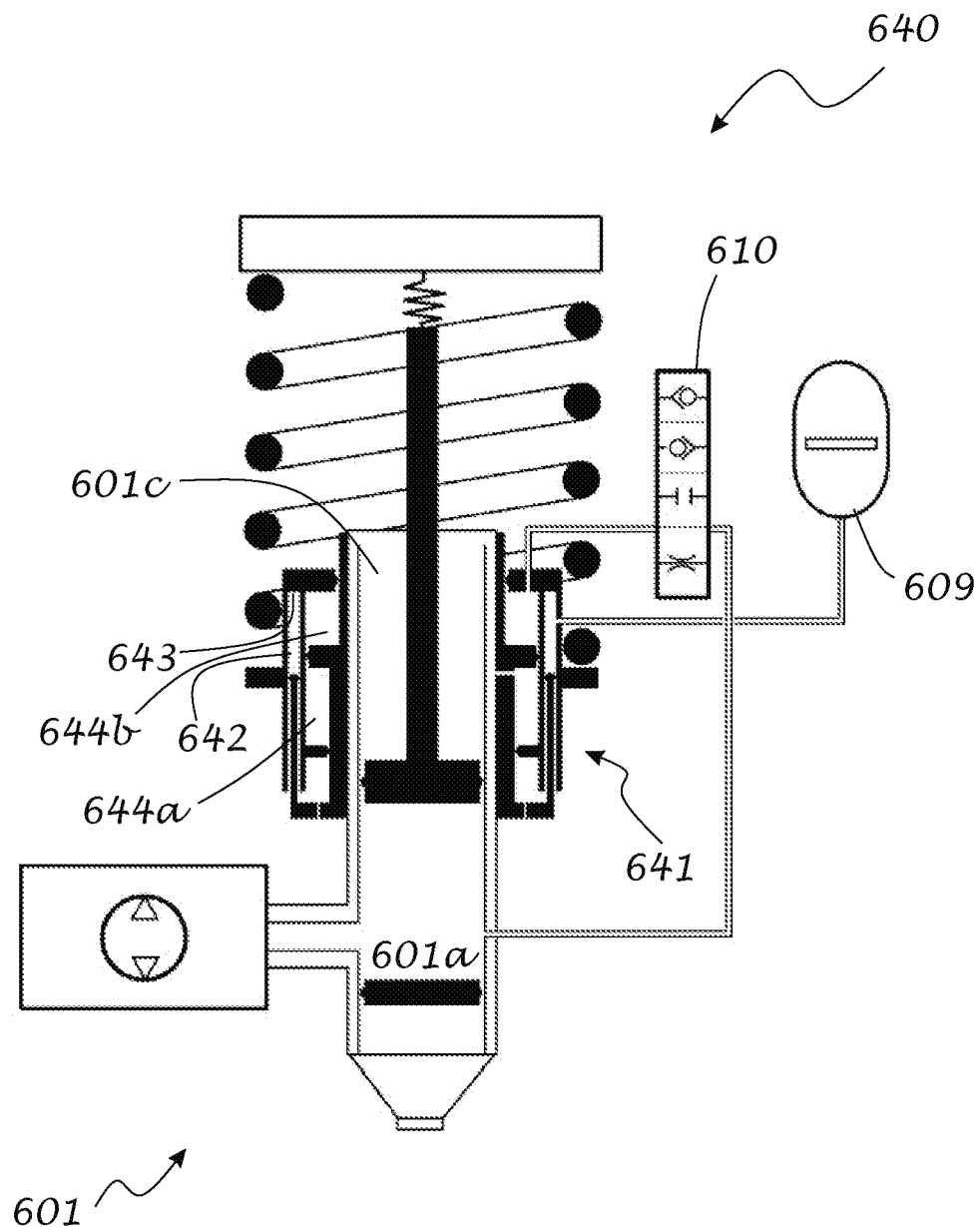
FIG. 27 illustrates another embodiment of an integrated actuator with an active suspension actuator and an annular double-acting spring perch actuator assisted by a pressurized accumulator.

FIG. 27 illustrates still another embodiment of an integrated actuator 640 that includes primary actuator 601 and auxiliary actuator 641. In this embodiment, the pressure in an accumulator is provided to auxiliary volume 642 of an auxiliary actuator piston where it is applied to a corresponding area 643. The volumes 601c and 601a are in fluid communication with volumes 644a and 644b respectively.

Figure 28:
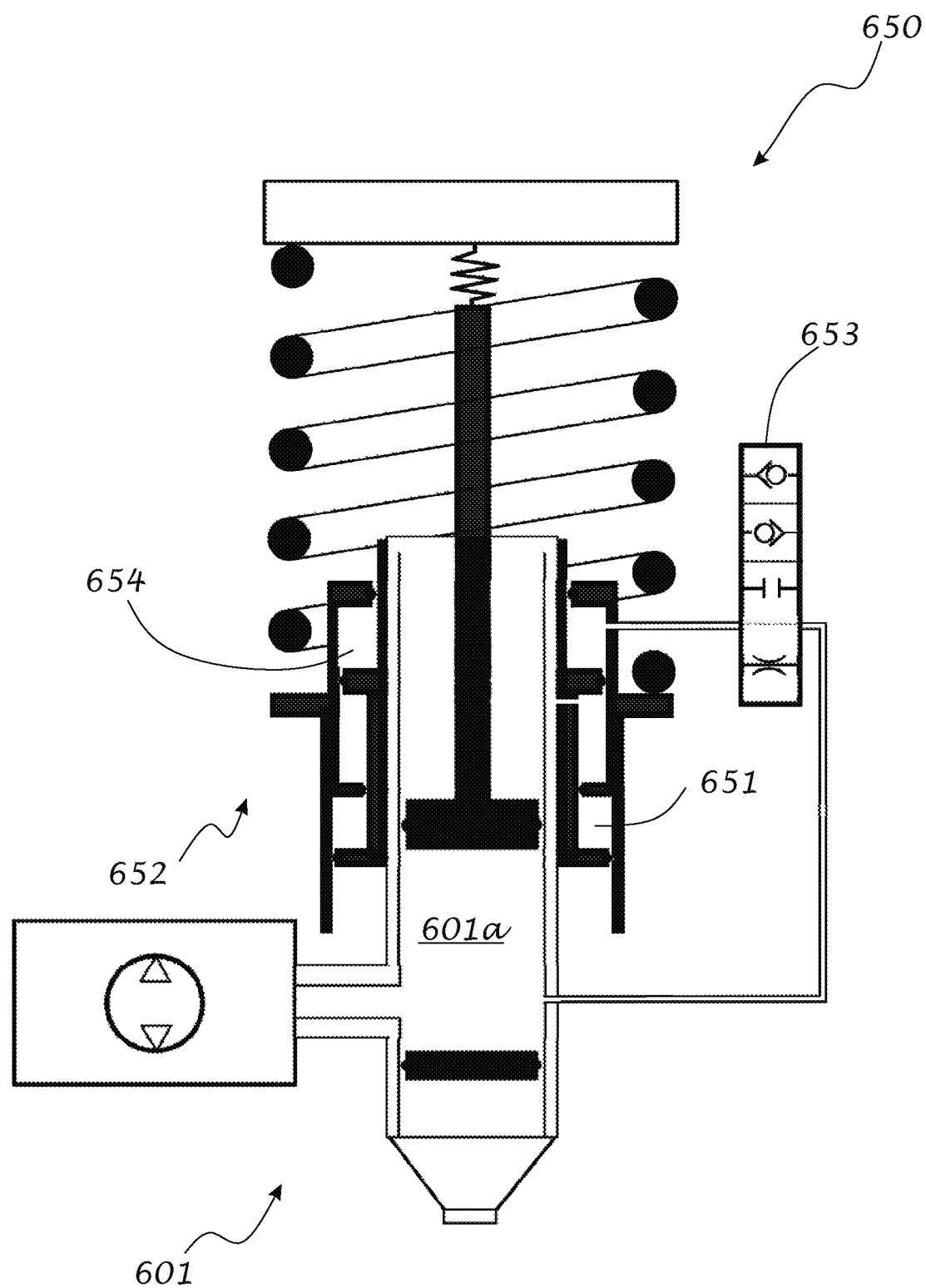
FIG. 28 illustrates still another embodiment of an integrated actuator with an active suspension actuator and an annular double-acting spring perch actuator assisted by a pressurized accumulator.

The embodiment in FIG. 28 illustrates another embodiment of an integrated actuator 650 that is similar to actuator 630 in FIG. 28. However, in the integrated actuator 650, the accumulator is entirely contained in annular volume 651 that is a part of auxiliary actuator 652. In addition, in actuator 650, the flow control device 653 is used to control the flow path between the compression volume 601a and annular volume 654. The flow control device 653 may be closed to hydraulically seal volume 654 and lock actuator 652 in place relative to primary actuator 601.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An active suspension unit of a motor vehicle, the active suspension unit comprising:
   a first active suspension actuator with an internal volume and a first piston that is slidably received in the internal volume and travels along a first axis, wherein the first actuator is interposed between a vehicle body and a wheel assembly;
   a second actuator with an internal volume containing hydraulic fluid and a piston with a second axis of travel, wherein a pressure of the hydraulic fluid induces a force on the piston along the second axis of travel, wherein the second actuator is interposed between the vehicle body and the wheel assembly;
   a first pressure source with at least a first port that is in fluid communication with the internal volume of the first actuator; and
   a second pressure source with at least a first port that is in fluid communication with the internal volume of the second actuator;
   wherein the two actuators are controlled to cooperatively apply a net force on the vehicle body and the wheel assembly;
   wherein the first pressure source is a first hydraulic pump that is reversible; and
   wherein the first actuator has a faster response than the second actuator.

2. The active suspension unit of claim 1, wherein the first axis and the second axis are operatively in parallel.

3. The active suspension unit of claim 1, wherein the second pressure source is a second hydraulic pump.

4. The active suspension unit of claim 3, wherein the first hydraulic pump and the second hydraulic pump are the same device.

5. The active suspension unit of claim 3, wherein at least one of the first hydraulic pump and the second hydraulic pump is a hydraulic motor-pump.

6. An integrated motion control unit, comprising:
   a first actuator that includes a housing with an internal volume separated into a compression volume and an extension volume by a double-acting piston and a piston rod attached to the piston;
   a hydraulic pump that has a first port that is in fluid communication with the extension volume, and a second port that is in fluid communication with the compression volume; and
   a second actuator that includes a first volume and a second volume and a double acting piston with a first surface acted on by the fluid in the first volume and a second surface acted on by the fluid in the second volume, wherein the first volume is in fluid communication with the first port of the hydraulic pump and the second volume is in fluid communication with the second port of the hydraulic pump;
   wherein the first actuator and the second actuator are operatively in parallel to each other, and interposed between a first and a second structure, and wherein the first actuator has a faster response than the second actuator.

7. The integrated motion control unit of claim 6, further comprising at least one low pass hydraulic filter located along a flow path between the hydraulic pump and the second actuator.

8. The integrated motion control unit of claim 7, further comprising a spring that is operatively in parallel with the first actuator and operatively in series with the second actuator.

9. The integrated motion control unit of claim 7, wherein the first actuator has a bandwidth extending to an upper limit of at least 10 Hz and the second actuator has a bandwidth extending to an upper limit of no more than 3 Hz.

10. The integrated motion control unit of claim 9, wherein the first actuator has a bandwidth extending to an upper limit of at least 20 Hz and the second actuator has a bandwidth extending to an upper limit of no more than 3 Hz.

11. The integrated motion control unit of claim 7, further comprising a third actuator that includes a first volume and a second volume and a double-acting piston with a first surface acted on by the fluid in the first volume and a second surface acted on by the fluid in the second volume, wherein the first volume is in fluid communication with the first port of the hydraulic pump and the second volume is in fluid communication with the second port of the hydraulic pump, and wherein the third actuator has a slower response than the second actuator.

12. The integrated motion control unit of claim 11, wherein the third actuator has a bandwidth extending to an upper limit of no more than 0.5 Hz.

13. The integrated motion control unit of claim 6, wherein the first structure is a vehicle body of a vehicle and the second structure is a wheel assembly of the vehicle.

14. The integrated motion control unit of claim 6, wherein the first actuator has a bandwidth up to at least 20 Hz and the second actuator has a bandwidth up to no more than 3 Hz.

15. The integrated motion control unit of claim 6, wherein the hydraulic pump is a hydraulic motor-pump.

* * * * *